United States Patent [19]

Ramsperger et al.

[11] 3,967,816
[45] July 6, 1976

[54] FIXTURE BLOCK SERVING AS A MANUFACTURING ACCESSORY

[75] Inventors: Hans Ramsperger, Lossburg-Rodt; Rolf Kölblin, Oberndorf (Neckar), both of Germany.

[73] Assignee: Mauser-Schaerer GmbH, Germany

[22] Filed: Feb. 20, 1975

[21] Appl. No.: 551,090

[30] Foreign Application Priority Data
Feb. 21, 1974  Germany............................ 2408350

[52] U.S. Cl..................................... 269/9; 269/86; 269/95; 269/321 A
[51] Int. Cl.².......................................... B23Q 3/00
[58] Field of Search ................ 269/95, 100, 86, 88, 269/9, 321 A; 29/200 J, 200 P

[56] References Cited
UNITED STATES PATENTS

| | | | |
|---|---|---|---|
| 2,401,054 | 5/1946 | Daley | 269/9 |
| 2,409,936 | 10/1946 | Hunt | 269/95 |
| 2,471,361 | 5/1949 | Trefz | 269/95 |
| 2,671,366 | 3/1954 | Beusch | 269/95 |
| 2,816,489 | 12/1957 | Robbins et al. | 269/321 A |
| 2,887,017 | 5/1959 | Lassy | 269/321 A |
| 3,105,330 | 10/1963 | Grage | 269/95 |
| 3,245,678 | 4/1966 | Riehle | 269/321 A |

*Primary Examiner*—Al Lawrence Smith
*Assistant Examiner*—Robert C. Watson
*Attorney, Agent, or Firm*—McGlew and Tuttle

[57] ABSTRACT

The fixture block is adapted to be combined with further correspondingly designed accessories with the aid of which workpieces to be machined can be brought into proper position or orientation for the particular machining operation, such as planing, milling, drilling and the like, and maintained in such proper position or orientation during at least one working cycle. The fixture block has horizontal and vertical contact surfaces designed as aligned rows of coplanar projecting areas separated by machined rows of coplanar recessed areas. The block is an L-shape body having a vertical leg and a horizontal leg, with the length and width of each leg being equal to each other and to the length and width, respectively, of the other leg, and with the thickness of each leg being equal to one-half its length or width. All surfaces of the block are formed with a plurality of tapped bores, and with smooth untapped bores of different diameters which at least partly intersect each other within the block. The intersecting bores preferably are through bores, and at least one through bore extends, perpendicularly to the outer surface of each leg, from one of the projecting areas. The tapped holes serve for mounting of the corresponding designed manufacturing accessories which complement the fixture block, and the through bores serve to receive auxiliary means for effecting mechanical, hydraulic, pneumatic, and/or electromagnetic clamping of workpieces to be machined.

7 Claims, 32 Drawing Figures

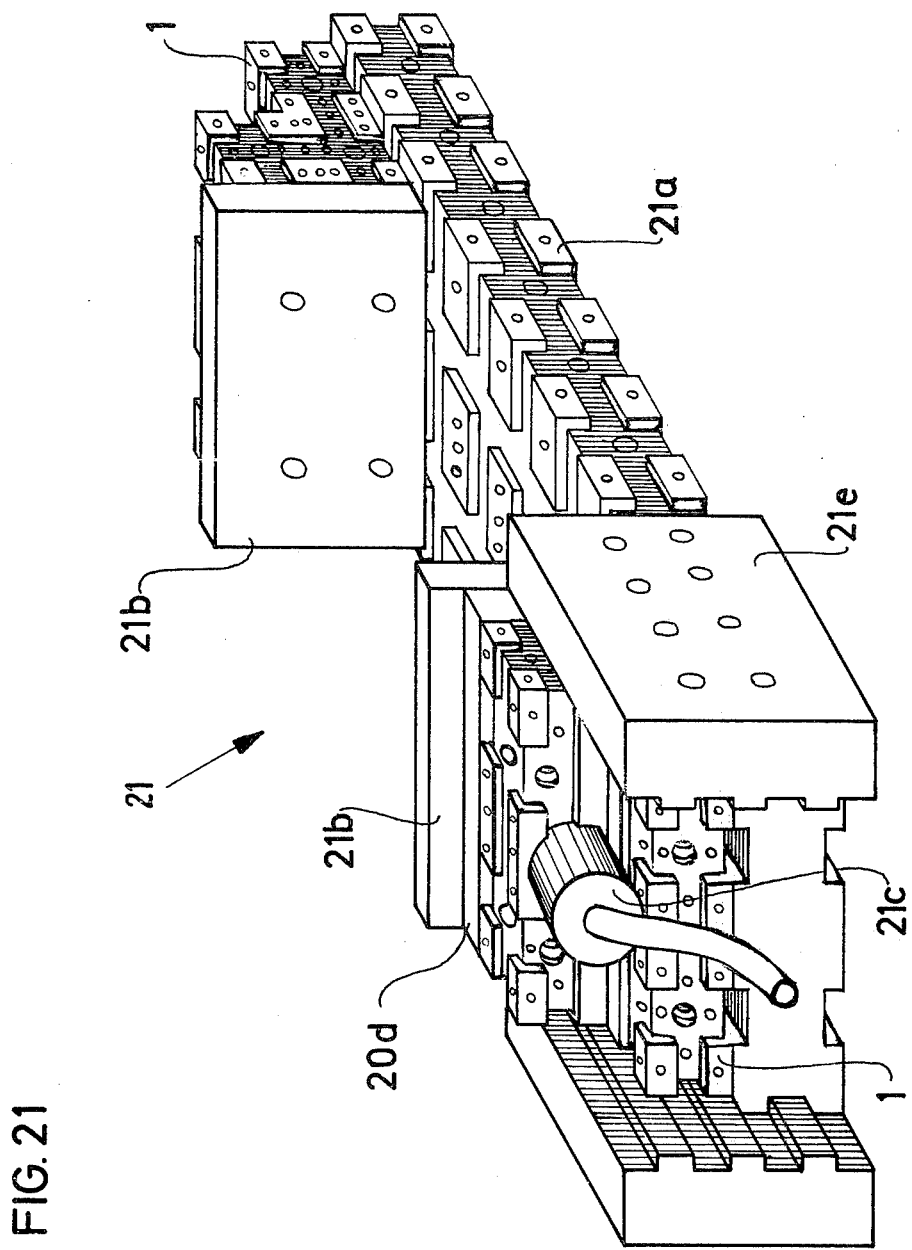

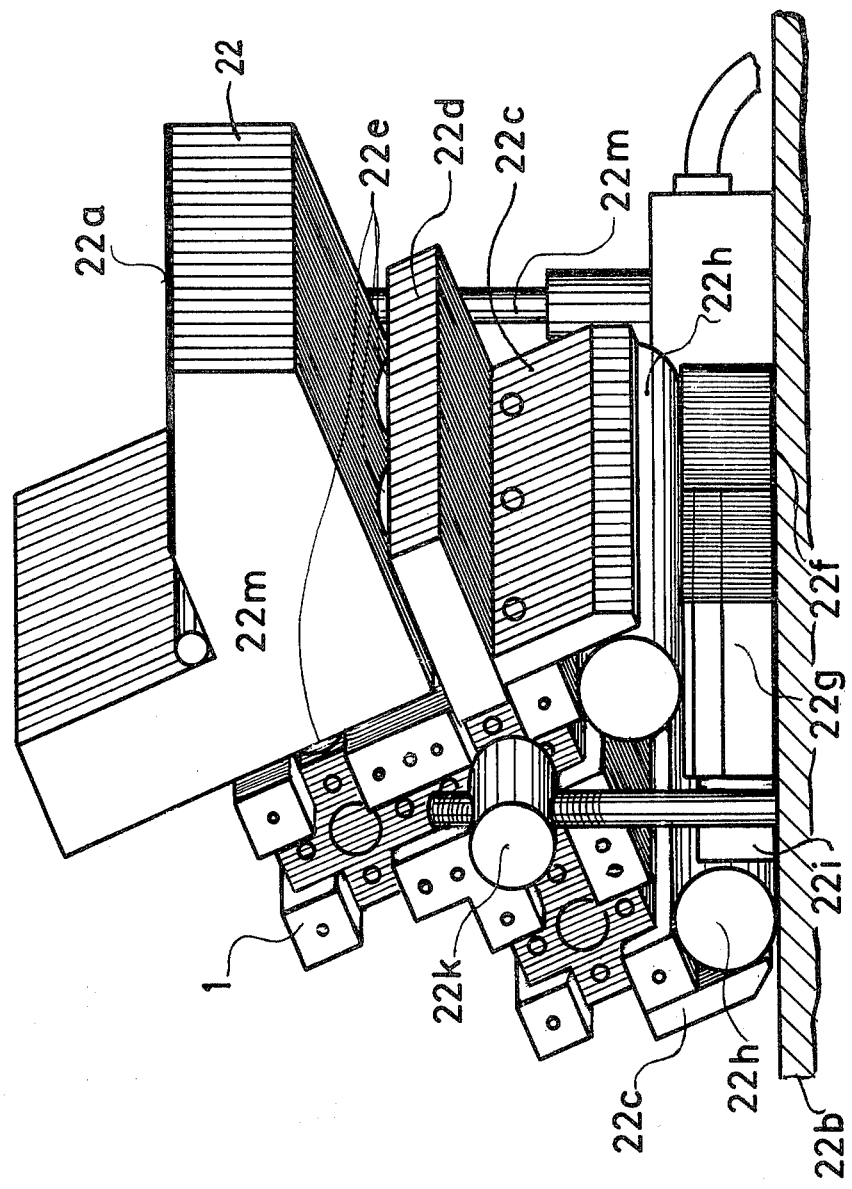

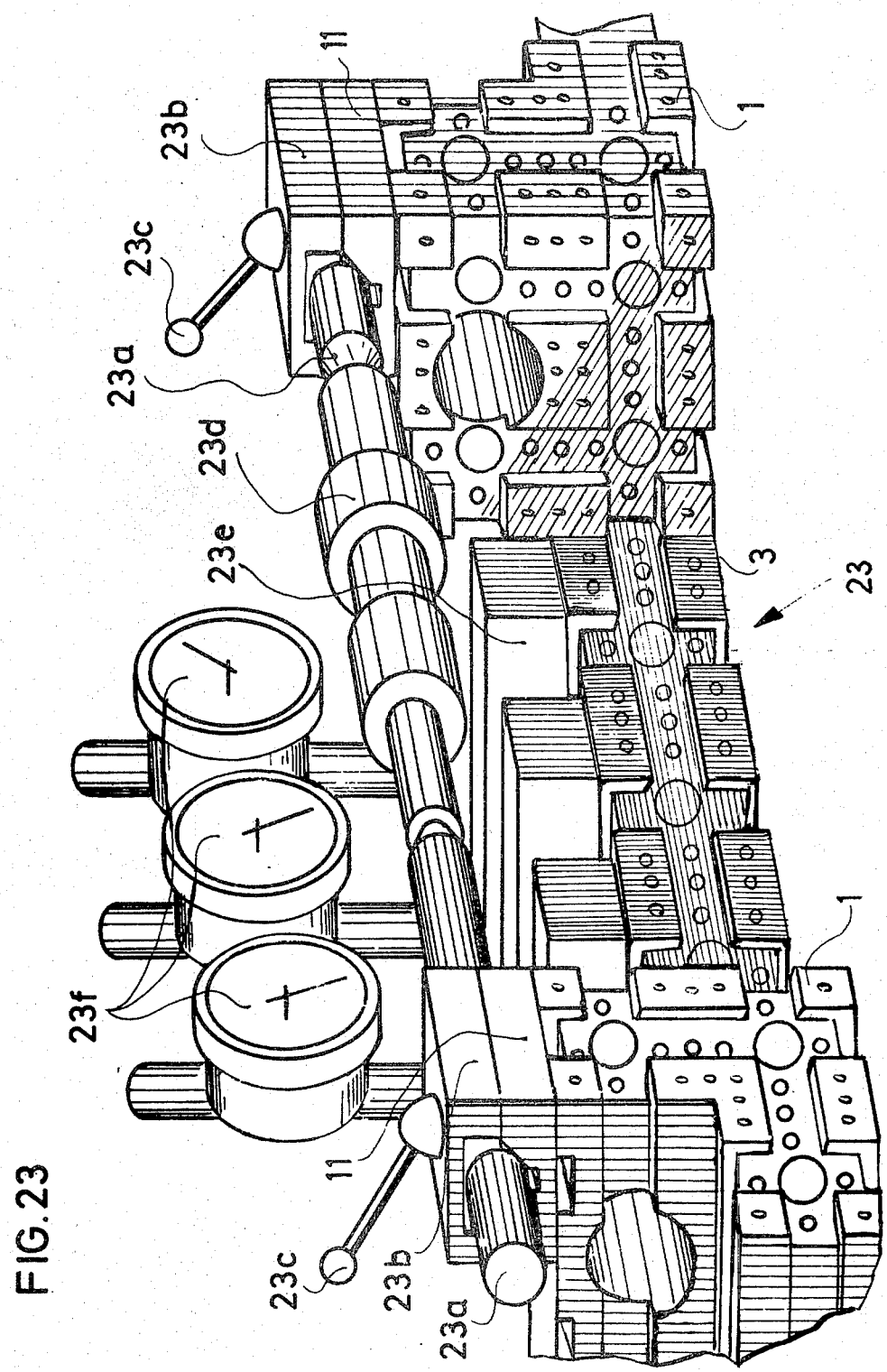

FIXTURE BLOCK SERVING AS A MANUFACTURING ACCESSORY

FIELD AND BACKGROUND OF THE INVENTION

This invention relates to a fixture block serving as a manufacturing accessory, particularly for the machining of metal or similar workpieces, and adapted to be combined, through contacting surfaces, with further correspondingly designed accessories and to be instrumental in bringing workpieces to be machined into proper position or orientation for the particular machining operation, such as planing, milling, drilling and the like, and maintaining the workpieces in such proper position or orientation during at least one working cycle, the fixture block having horizontal and vertical contact surfaces designed as aligned rows of coplanar projecting areas separated by machined rows of coplanar recessed areas, the recessed areas being formed, for example, by planing, milling or the like operations.

Particularly for machining metal workpieces, it is well known to use correspondingly designed and suitable manufacturing accessories in the form of fixtures. The term "machining" is understood to include, substantially, manufacturing operations performed by boring, milling, planing, shaping, broaching, honing and grinding machines. Manufacturing accessories, in the form of fixtures, and which are used mainly in connection with the mentioned machines, serve primarily to reduce the machining time of the workpiece and the manufacturing costs of the part and of the completed unit, as well as to improve the quality of the machined part. In addition, they make is possible for unskilled persons and workers unfamiliar with the particular operation to perform high quality work. The manufacturing efficiency of the individual working steps and/or operations, as well as the efficiency of the machine, and thus also of the worker, depends largely on the purposeful construction of the respective fixture.

In course of time, certain basic rules have been established for the design of fixtures. In the following, as far as necessary, these rules are briefly specified since, hereinafter, the fixture underlying the present invention will be compared therewith:

1.0 The fundamental condition for a successful design of a manufacturing accessory is a close cooperation between the designer of the accessories and the planner of the manufacturing process.

2.0 The Design and construction of the accessory have to take into account the number of workpieces to be machined and the time of starting the manufacturing process, since both parameters are determining factors for the quality and costs of a fixture and, thus, for the manufacturing stage.

3.0 It must be checked whether so-called standard fixtures (general accessories), or already existing fixtures which, however, are no longer used at that time, can be adapted, provided that costs are saved thereby.

4.0 While designing and constructing fixtures, standardized constructional elements (such as clamping plates, angleplates, handles, screws, handwheels, etc.) are to be considered on a largest scale and the pertinent DIN and AWF standards, as well as, if necessary for supplementation, the corresponding factory standards which are to be used.

5.0 In taking into account a sufficient stiffness of shape, all fixtures are always to be designed as light in weight as possible in order not to unnecessarily fatigue the worker at work with the result of an aversion to the use of the fixtures.

6.0 Care must be taken to design the fixtures in a manner as simple as possible, with the shortest flow of stress in the clamping elements and to avoid any complicated and intricate mechanisms so as to obtain a clamping and unclamping time as short as possible. Moreover, in any case, a machined surface and, for oblique bores, auxiliary bores, are to be provided on the body of the fixture, to be able to start from these surfaces or bores while mounting the fixture and measuring.

7.0 The component parts of a fixture must not affect the visibility of the locations to be machined on the workpiece nor their accessibility. Also, the fixture bodies must be designed and the component parts arranged so as to permit an unhindered discharge of chips and of the coolant.

8.0 If possible, the first working sequence is to be provided so that the workpieces can be received, also during the subsequent operations in the following fixtures, by an already finish-machined surface, turned-off face, or bore.

9.0 With fixtures having to absorb higher working pressures, the clamping elements must never be arranged so as to be particularly stressed by the working pressure. Instead, they must always be positioned so that only portions fixed to or integral with the fixture are exposed to the load. In addition, the bearing area for the clamping elements is to be chosen so that a canting or tilting of the workpieces remains prevented, and that the workpieces are applied against the fixture only at locations with no mold or die seams, intakes, or ascending-tube sockets.

10.0 The clamping elements on a fixture are always to be chosen so as to avoid loose parts, such as wrenches, pins, wedges and hammers, whenever practicable, because an improper handling therewith may damage the fixture and jeopardize its working accuracy.

11.0 A fixture must always be designed so as to practically prevent any faulty insertion of the workpiece. Of course, in addition, a fixture also has to be accident-safe and fool-proof in operation. Moreover, a sufficient space must be provided for the fingers between the clamping elements and the fixture body as well as between the workpiece and the fixture to permit an insertion and removal of a workpiece without injuring fingers or hands.

12.0 Finally, drill-jig bushings or the like are to be positioned so as to have a certain spacing from the workpiece, particularly if the workpiece is of a light metal, yellow brass, etc. If possible, slip-renewable bushings are also to be avoided. While drilling holes having unequal diameters, the outer diameters of the slip-renewable bushings are to be determined so as to prevent a mistake and, thereby, scrapwork.

Fixtures serving as manufacturing expedients, which can be completed and used in the manner of a building-block system, are already known. Like the present invention to be explained hereinafter, such known building block systems substantially comprise basic elements, build-up elements, elements for determining the position, as well as clamping and connection elements.

As already indicated by the term "basic elements", such elements are of primary importance because the further building up of the system is fully determined by the basic elements and dependent thereon.

In a well-known fixture building-block system, aside from a base plate provided with crosswise extending T-grooves, a plurality of differently designed angle clamping plates are the fundamental elements of the building-block system:

One of the angle clamping plates, whose base intersects with the front surface at 90°, is provided, on its back side, with two stiffening ribs extending obliquely at an angle of approximately 25° and blending, at both their lower and upper ends, into a clamping strip which is provided with a T-groove. Both the base and the front surface of the angle clamping plate are provided with T-grooves crossing each other. Five horizontal and three vertical T-grooves are provided in the front surface. The base is formed with two sets of three T-grooves, with the two sets of grooves crossing each other. At each point of intersection of the two surfaces, tapholes are provided in the groove bottom. The two stiffening ribs are provided with two holes having unequal diameters, which extend coaxially of the horizontal T-grooves provided in the front surface. The two holes are intended to reduce the weight of the clamping plate. It is evident that the angle clamping plate may also be used in a position turned through 90°, i.e., with the front surface forming the base and the smaller base forming the clamping or working surface.

A variant of the angle clamping plate just described substantially comprises a cast body closed at all sides and having a triangular shape where the third leg is inclined at an angle of approximately 30°. This clamping plate is provided with crossing T-grooves on all sides. While the front surface, which is larger than the base, is provided with three horizontal and two vertical, mutually intersecting, rows of grooves, the base comprises only two rows of two grooves each in each axial or dimensional direction. The inclined surface comprised also two rows of mutually intersecting grooves, while the horizontal upper connection surface, between the front surface and the inclined surface, is provided with only one T-groove extending parallel to the horizontal grooves of the front surface. In the direction parallel to the bottom surfaces of the grooves, the clamping plate is provided with a through hole. Tapped holes are entirely absent, not only at the points of intersection of the T-grooves, but everywhere. Some through holes provided in the lateral limiting surfaces serve for the connection of the angle clamping plate with one or more other plates.

In principal, an immediately apparent drawback of the first described angle clamping plate is the fact that it has any variant at all. This means, on the one hand, that the plate is no basic element in the proper sense of the word and, on the other hand, that the use of the respective building-block system is unnecessarily made more expensive because a variant of the clamping plate, even several specimens, must be procured and stored.

Even if the just mentioned drawback could be tolerated after all, the use in principle of the T-grooved elements makes the entire building-block system so expensive that the effect of economization aimed at while using the system is nullified automatically. That is, it is evident and instantly clear to anyone skilled in the art that the careful manufacture of a necessarily large number of precision-machined T-grooves makes the structural parts of the system expensive to such an extent that, already for this very reason, a not insignificant number of potential users would probably desist from equipment with such building blocks.

SUMMARY OF THE INVENTION

In view of the foregoing, but making use of the building-block system which, in principle, is definitely advantageous, the present invention is directed to a true and, at the same time, optimally designed elementary fixture block which avoids all of the drawbacks and disadvantages inherent in the known system.

In accordance with the invention, as a basic element, the fixture block comprises an L-shape body having a vertical leg and a horizontal leg, with the length and width of each leg being equal to each other and to the length and width, respectively, of the other leg, and with the thickness of each leg being equal to one-half its length or width. All surfaces of this block are formed with a plurality of tapped bores and with smooth untapped bores of different diameters which at least partly intersect each other within the block.

Starting from this basic idea, in accordance with a development of the invention, the tapped holes are provided on all sides, both in the recessed areas and in the projecting areas which latter have been left unmachined during the machining of the recessed areas.

Another substantial feature of the invention is that the intersecting bores are through bores and that they are provided substantially in the recessed areas of the body surfaces.

It is also essential that at least one through bore, extending at a right angle through each leg, departs from one of the projecting areas of the body surface.

The invention is ingeniously completed finally by two further features, of which one is that the through bores serve for the fastening of correspondingly designed manufacturing accessories complementing the fixture block, and the other has the purpose of using the through bores for the reception of correspondingly designed auxiliary means effecting the mechanical, hydraulic, pneumatic and/or electromagnetic clamping of the workpieces to be machined.

It will be clear that the invention offers a considerable number of advantages: As will be proved hereinafter in considering various embodiments, the fixture block provided by the invention, alone or also in combination with further, correspondingly designed build-up elements, elements for determining the position, and/or clamping and connection elements, is designed and constructed in an extremely simple, practical and useful manner.

With its deliberately chosen L-shape body, the inventive fixture block is geometrically a very simple structure. This favors not only its further use but also the way in which it can be manufactured and shaped. The rectangularity of the body on all sides permits an easy shaping, preferably by machining, with a high accuracy.

As to the machining of the basic element, it is extremely advantageous, because of costs saving, that, for well considered reasons, an expensive provision of T-grooves could be avoided. For example, for receiving hydraulic, pneumatic or also mechanial clamping and connection elements, the bores provided in the basic element need only a machining of medium precison. The same applies to the tapped holes which are provided in the fixture block practically on all sides.

The advantages of the invention, of course, are not restricted to those already mentioned. Relative to the building-block systems of the prior art, it is particularly advantageous that only a single basic element is necessary and, for example, no varient thereof. Just this fact influences quite substantially the storage and, therefore, the capital expenditures and depreciations.

As to the work planning, starting from the basic element and the single building blocks associated therewith as well as from the respective application, the time for the building up of the assembly can be determined very rapidly so that, from this point of view again, the use of the basic element along with the build-up, etc., elements necessary in each case, has a not inconsiderable effect on production costs.

Aside from what has just been said, the advantages of the L-shape basic element appear also if, for example, it is used in combination with elements of other, conventional building-block systems.

Without any difficulties, the building-block system comprising the inventive basic element can be used and mounted instead of individually designed manufacturing fixtures, both from the start and, subsequently, in production lines, such as transfer lines or the like. In such a use, it is clear that building-block elements, so to speak "from the rod", are considerably less expensive than individually designed fixtures.

A 60-mm-module system applied to both the L-shape basic element and to its build-up elements makes it possible to produce any desired or required dimension within the system of coordinates.

A further advantageous application of the inventive fixture block along with its system building blocks is its use for measuring and/or testing purposes. In this, as well as in other, applications, a sine angle-system ranging up to an inclined position of 45° can be provided by the user in a most simple manner while avoiding any computation.

If the advantages offered by the invention are now compared with the basic rules mentioned in the beginning, it should be clear, to any one familiar with the design as well as with the optimum use of manufacturing accessories, thus for the fixture designer and the work planner, that the present invention complies with eleven of the twelve basic rules, while basic rule 1.0 is in any event a condition sine qua non.

An object of the invention is to provide an improved fixture block serving as a manufacturing accessory.

Another object is to provide such a fixture block which is adapted to be combined, through mutual contacting surfaces, with further correspondingly designed accessories for holding and fixing workpieces to be machined.

A further object of the invention is to provide such a fixture block which is free of the disadvantages of known similar blocks.

Yet another object of the invention is to provide such a fixture block which is geometrically a very simple structure permitting an easy shaping, as by machining, with a high accuracy.

A further object of the invention is to provide such a fixture block which, in its manufacture, does not require expensive machining of T-grooves.

For an understanding of the principles of the invention, reference is made to the following description of typical embodiments thereof as illustrated in the accompanying drawings.

BRIEF DESCRIPTION OF THE DRAWINGS

In the Drawings:

FIG. 21 is a perspective view of a fixture block of FIG. 1 as used as a hydraulically or pneumatically actuated vise;

FIG. 22 is a perspective view of a fixture block as shown in FIG. 1 used as a support of a workpiece to be milled, ground, etc., in a 45° oblique position, following the sine principle, supported by gauge rolls and gauge blocks;

FIG. 23 is a perspective view of two fixture blocks of FIG. 1 spaced from each other and used as a measuring block for the measuring of rotationally symmetrical workpieces;

DESCRIPTION OF THE PREFERRED EMBODIMENTS

Figure 1:
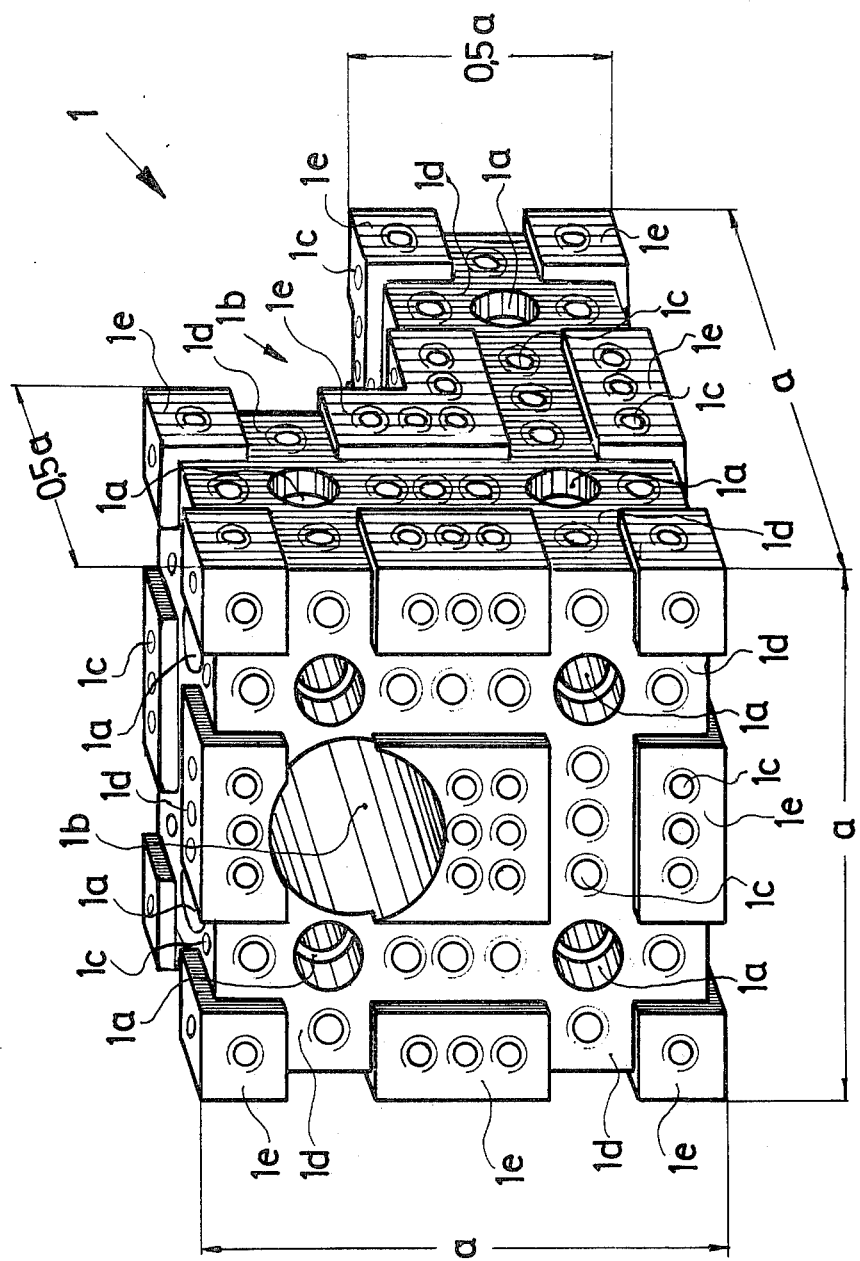
FIG. 1 is a perspective view of a substantially L-shape fixture block.

As shown in FIG. 1, the basic fixture block of the invention, generally indicated at 1, is substantially an L-shape body having a vertical leg and a horizontal leg. The length and width of each leg is indicated at a, and are equal to each other and to the length and width, respectively, of the other leg. The thickness of each leg is equal to ½ its length or width, or 0.5a.

On all sides, the fixture is provided with a plurality of smooth through bores 1a which partly intersect within the body. Aside from a smooth through bore 1b provided in each leg and having a relatively large diameter and intersecting with the respective bore of the other leg at an angle of 90°, the fixture is further provided with a plurality of tapped holes 1c on all sides.

For reasons of a simpler and, thereby, less expensive precision machining, as well as for reasons of reducing the weight, all of the outer surfaces of the fixture body 1 are provided with recessed areas 1d. These areas extend in both the horizontal and vertical direction. All vertical as well as all horizontal recessed areas are always parallel to each other. The projecting areas left unmachined during the machining of the recesses are designated 1e and fine-finished, for example, ground, in accordance with the requirements on precision.

While the tapped holes 1c serve for the securing of the manufacturing accessories, which are designed so as to complement fixture block 1, the through bores 1a, 1b are intended for receiving correspondingly designed auxiliary means effecting, for example, the mechanical, hydraulic, pneumatic and/or electromagnetic clamping of the workpiece to be machined.

Figure 2:
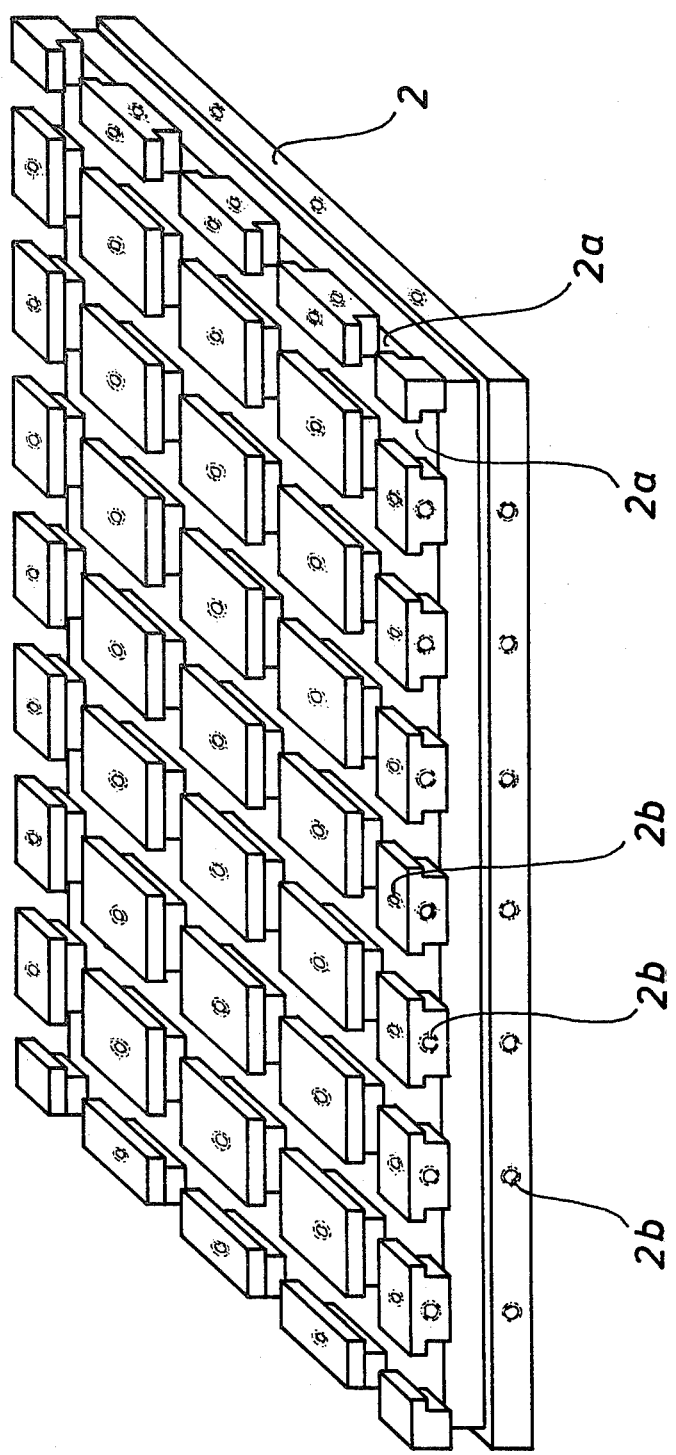
FIG. 2 is a perspective view of a baseplate provided with crosswise extending T-grooves, to be used in combination with the fixture block according to FIG. 1.

The baseplate 2 shown in FIG. 2 serves, in connection with fixture block 1 and/or further manufacturing accessories, to build up a fixture assembly to be used for the machining, measuring or testing of workpieces.

Without it being an essential condition for the use or utilization of fixture block 1, baseplate 2 is provided with a system of T-grooves 2a intersecting at an angle of 90°. In a particularly advantageous manner, already known base-plates provided with T-grooves may be used for this purpose. However, such plates must be provided additionally with tapped holes 2b in order to correspond to fixture block 1 and to further manufacturing accessories necessary for the specific application.

Figure 3:
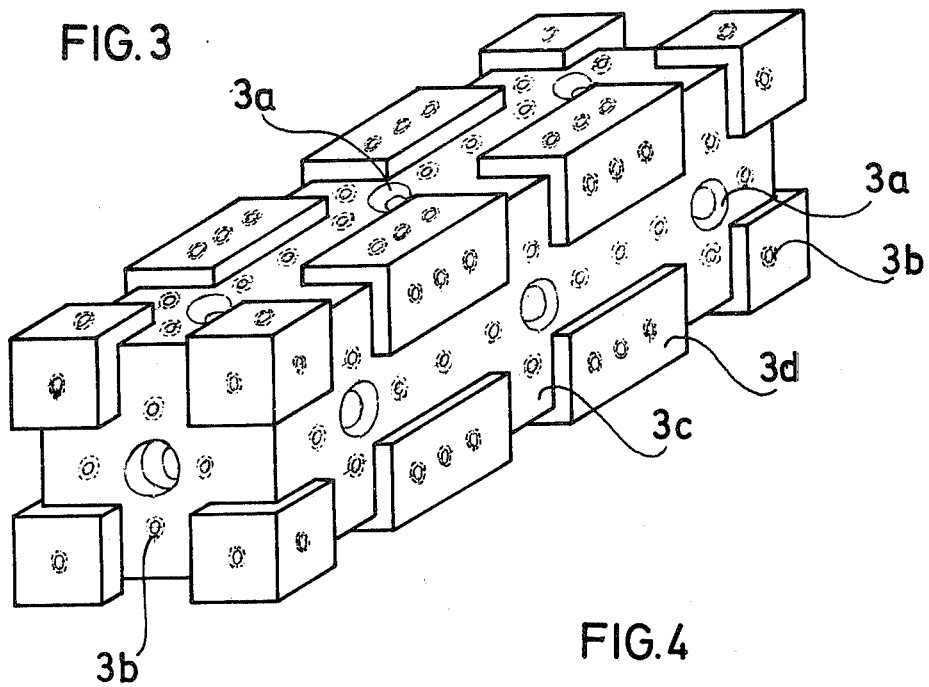
FIG. 3 is a perspective view of a universal building block in the shape of a rectangular parallelepiped, designed in the manner of the fixture block shown in FIG. 1.
Figure 4:
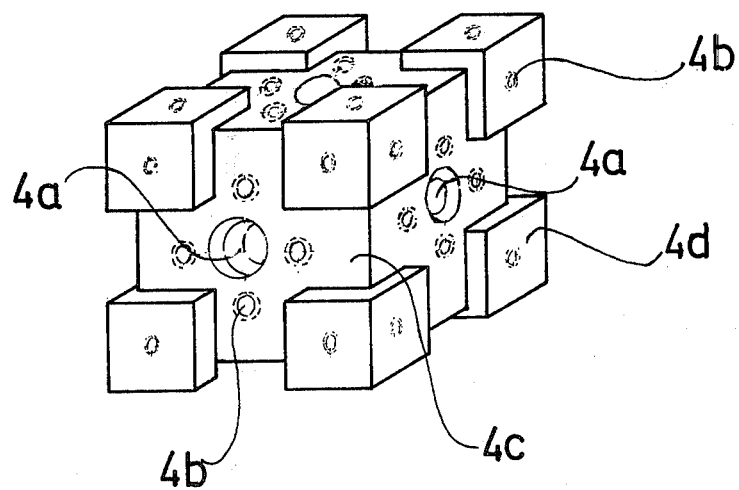
FIG. 4 is a perspective view of a similar universal building block designed in cube shape.

Bodies in and 4 shown in FIGS. 3 nd 4, respectively, are universal building blocks having the form of a rectangular parallelepiped (FIG. 3) or of a cube (FIG. 4). These two blocks also have the characteristics of the inventive fixture block 1, shown in FIG. 1, namely through bores 3a, 4a partly intersecting at an angle of 90°, tapped holes 3b, 4b, recessed areas 3c, 4c and projecting areas 3d, 4d.

Figure 5:
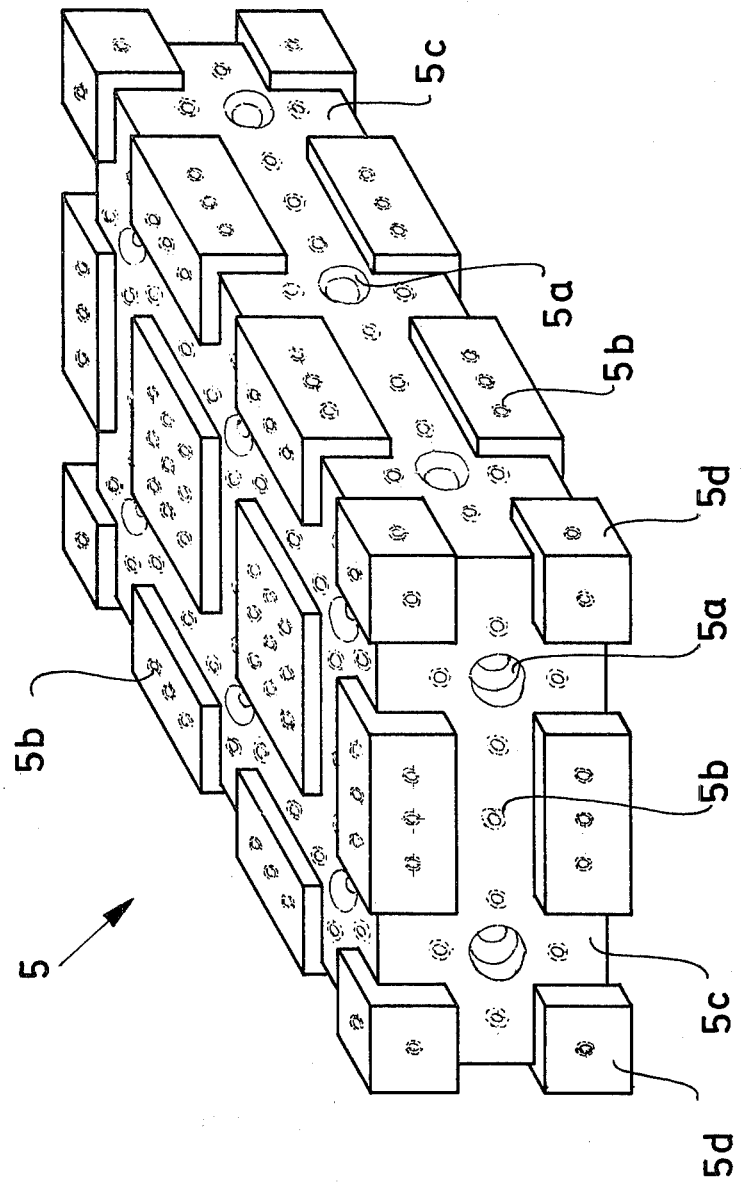
FIG. 5 is a perspective view of a similarly designed universal clamping plate in the shape of a wider parallelepiped.

FIG. 5 shows a universal clamping plate 5 designed in the manner of fixture block 1 (FIG. 1) and having a shape of a wider, rectangular parallelepiped. This block also serves, if necessary along with further manufacturing accessories belonging to the system, to supplement or combine with fixture block 1. Universal clamping plate 5 also comprises smooth through bores 5a intersecting at an angle of 90°, tapped holes 5b, recessed areas 5c and projecting areas 5d.

Figure 6:
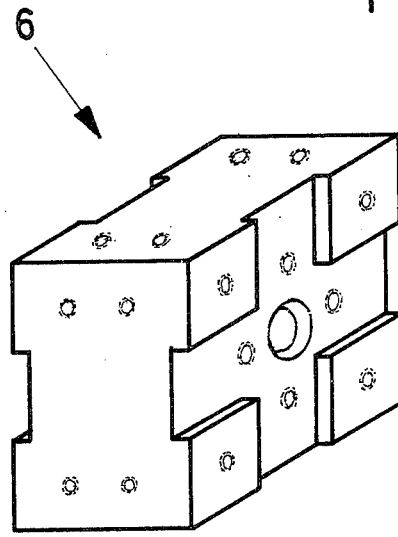
FIG. 6 is a perspective view of a similar universal building block having the shape of a plate.
Figure 7:
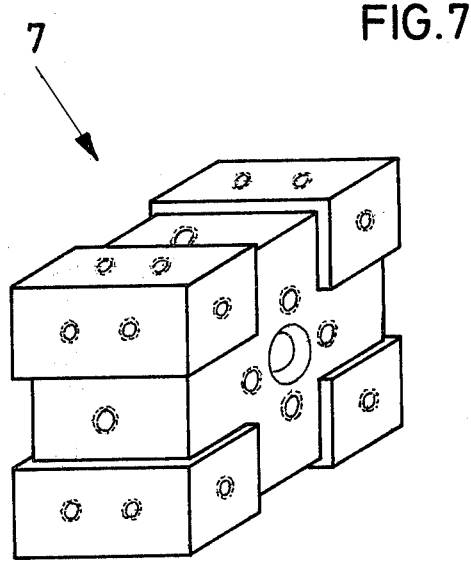
FIG. 7 is a view similar to FIG. 6, the crosswise extending recesses being modified.

Further universal building blocks 6, 7, both in the form of plates and comprising the structural and shape characteristics of fixture block 1 (FIG. 1) are shown in FIGS. 6 and 7, respectively. As compared to element 6, universal building block 7 is provided with modified crosswise extending recesses and projections.

Figure 8:
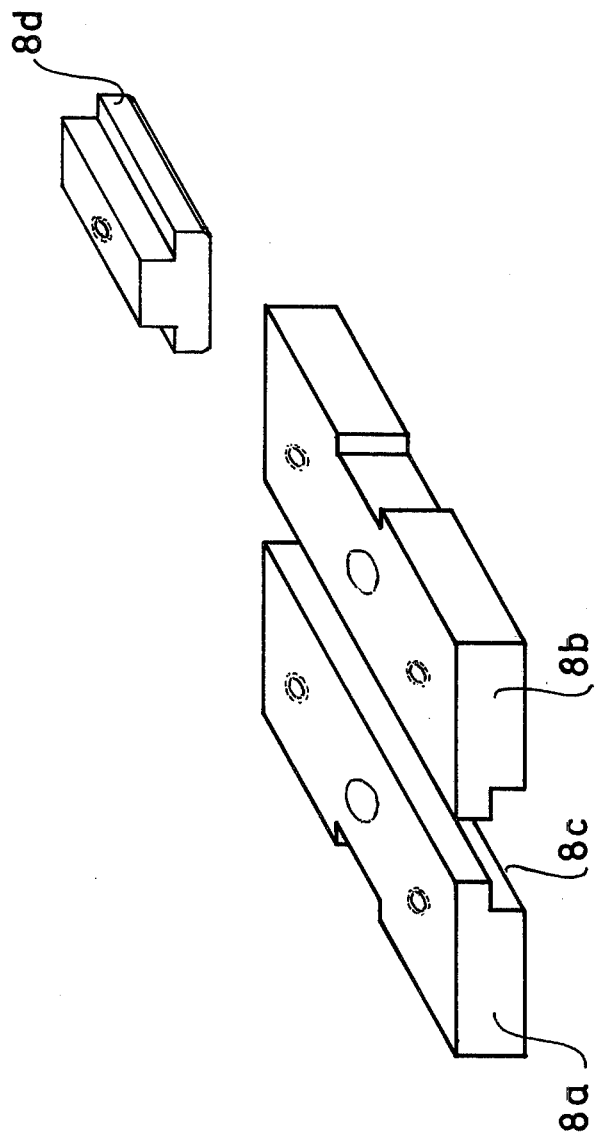
FIG. 8 is a perspective view of two correspondingly designed guide strips having parallel longitudinal recesses facing and completing each other to form a guideway for receiving a conformable T-piece.
Figure 9:
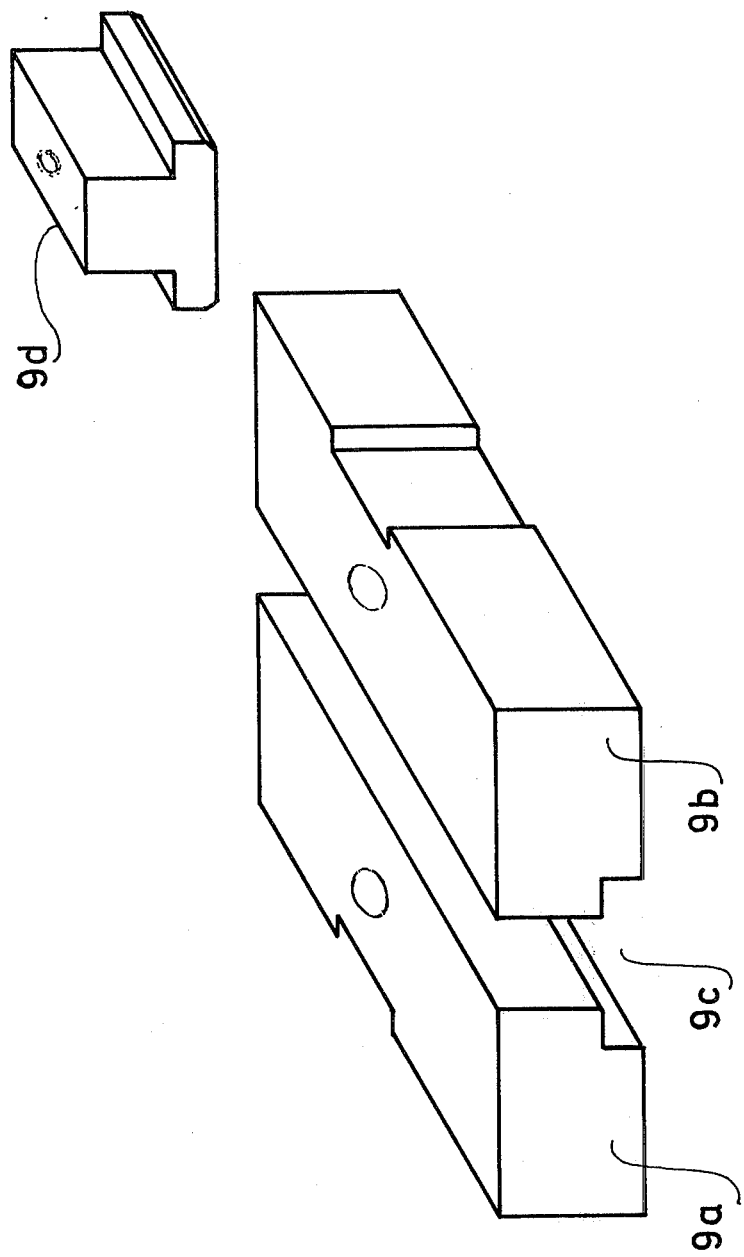
FIG. 9 is a view similar to FIG. 8, the structural height being modified.

The guide strips 8a, 8b and 9a, 9b, shown in FIGS. 8 and 9, respectively, are, in principle, of the same structure as fixture block 1 (FIG. 1), and differ from each other only in the structural height and the number and size of the vertically extending smooth through bores. The respective parallel longitudinal recesses 8c, 9c are opposed to each other, and complement each other to form a guideway adapted to receive a corresponding respective T-piece 8d, 9d.

Figure 10:
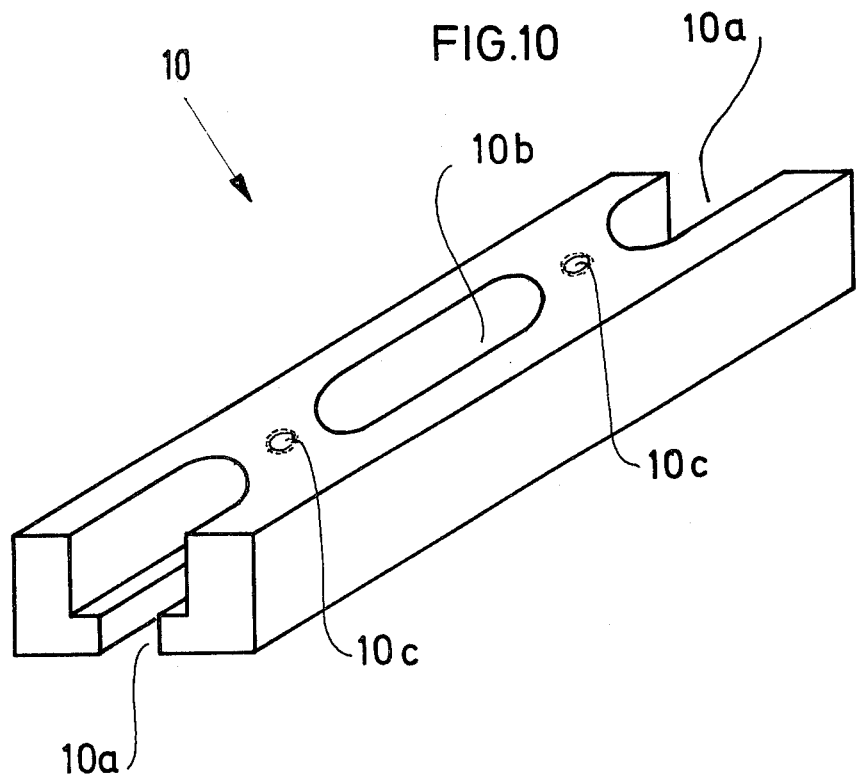
FIG. 10 is a perspective view of a guide strip having parallel longitudinal, partly L-shape, grooves.

Guide strip 10, shown in FIG. 10, is provided with a plurality of grooves 10a, 10b extending along the longitudinal center line of the strip and having a partly L-shape cross-section. Tapped holes 10c are provided between the individual grooves.

Figure 11:
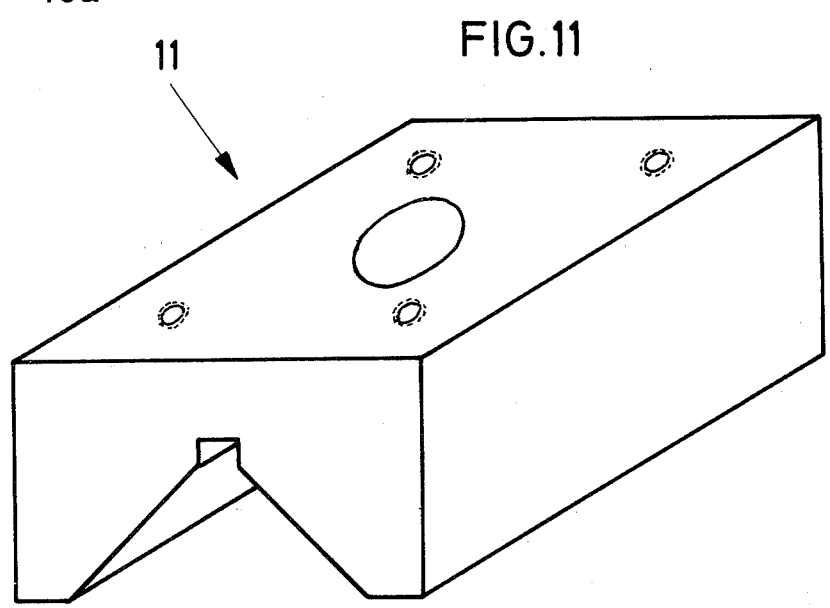
FIG. 11 is a perspective view of a prism for a drilling bridge, as an element supplementing or used in combination with the fixture block of FIG. 1.
Figure 12:
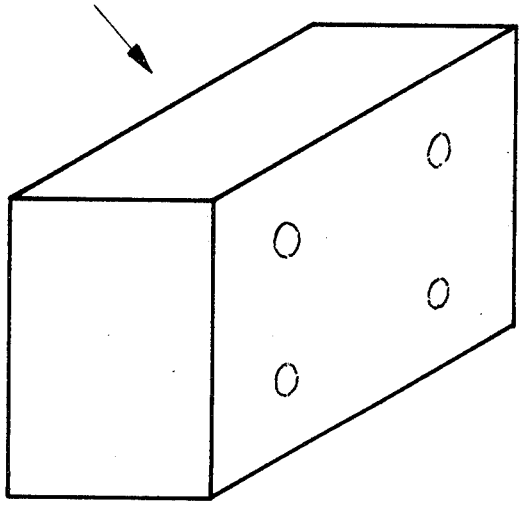
FIG. 12 is a perspective view of a contact jaw also used in addition to or combined with fixture of FIG. 1.
Figure 13:
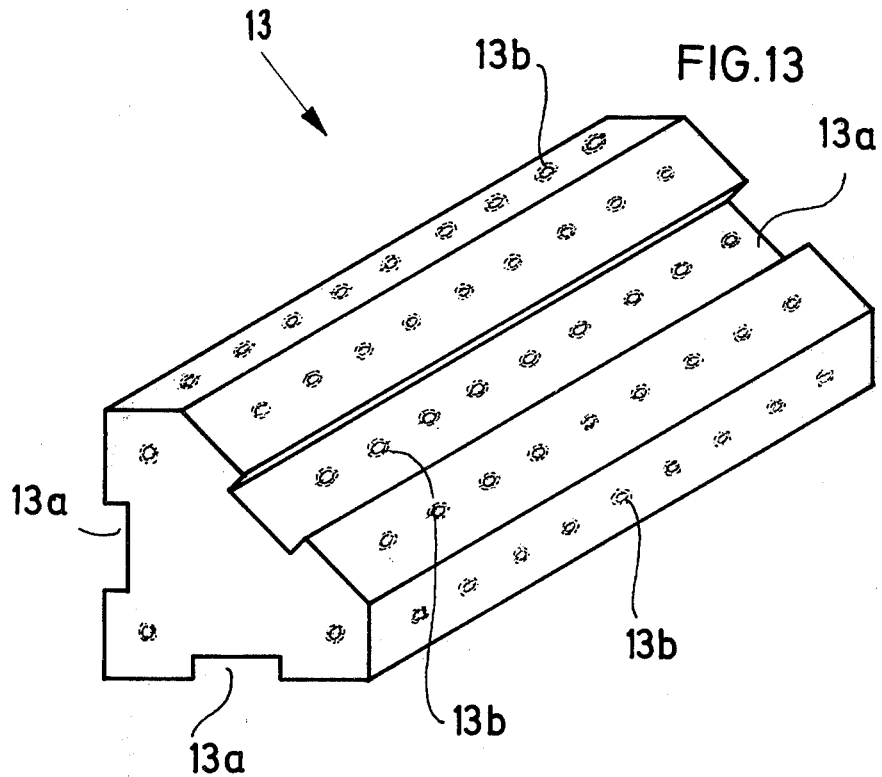
FIG. 13 is a perspective view of a clamping gib beveled at 45° and having three parallel longitudinal grooves.

FIGS. 11, 12 and 13 show further supplementing or combining elements of fixture block 1 (FIG. 1), namely, a prism 11 for a drilling bridge, a contact jaw 12 and a clamping gib 13 beveled at 45° and provided with three parallel longitudinal profiled grooves 13a extending longitudinally of gib 13. Tapped holes 13b are also provided.

Figure 14:
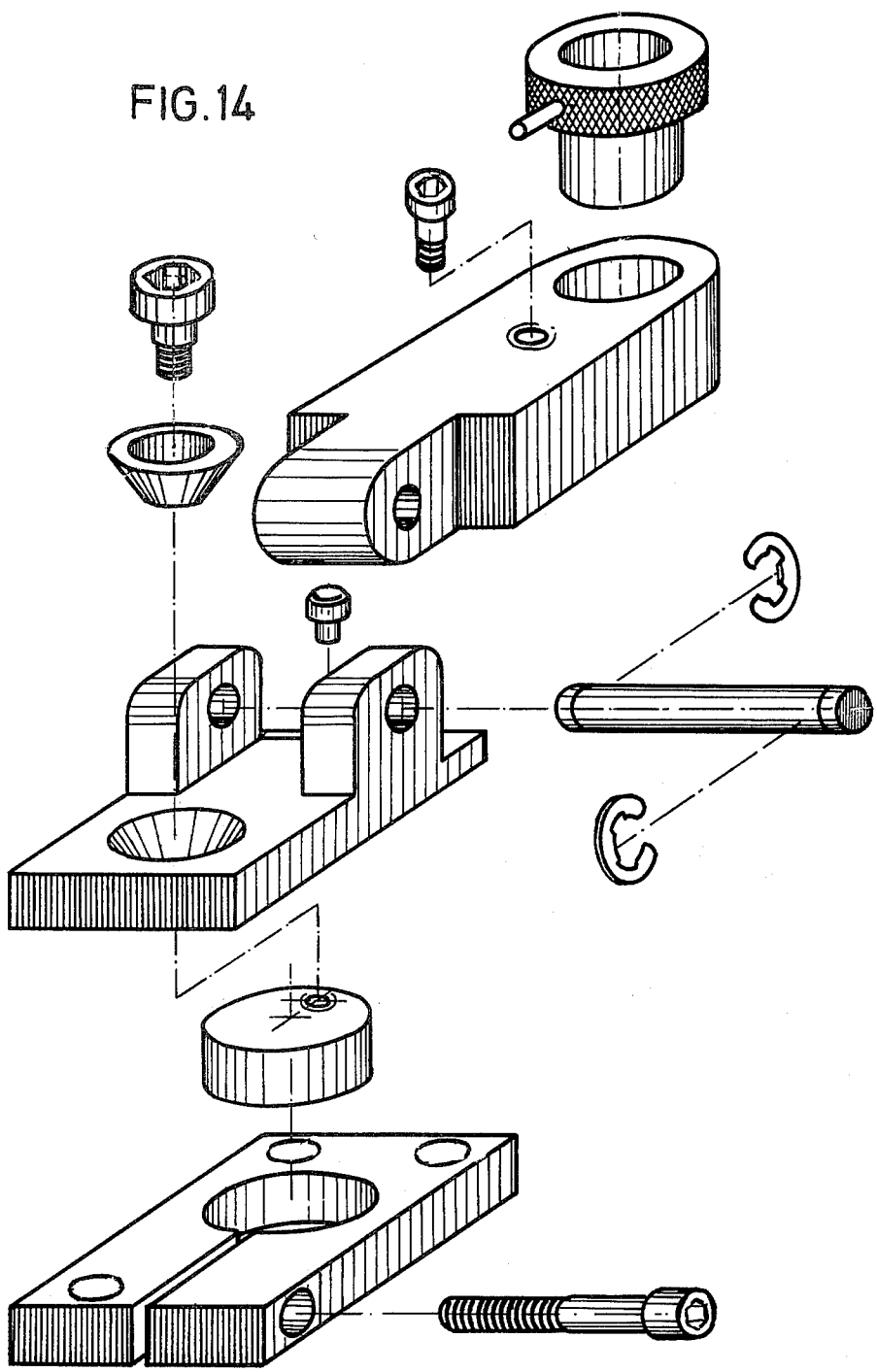
FIG. 14 is an exploded perspective view of component parts of a drilling bridge comprising a swinging mechanism, as an element to be used in addition to or in combination with the fixture shown in FIG. 1.

FIG. 14 is an exploded perspective view showing the parts for a drilling bridge, including a swinging mechanism, and which also serve as supplementing and combination elements for fixture block 1 (FIG. 1).

In comparison with the just-mentioned and still further supplementary and combining elements peculiar to the system, the practical application of fixture block 1 as a basic and build-up element for the machining of workpieces is not less important.

Figure 15:
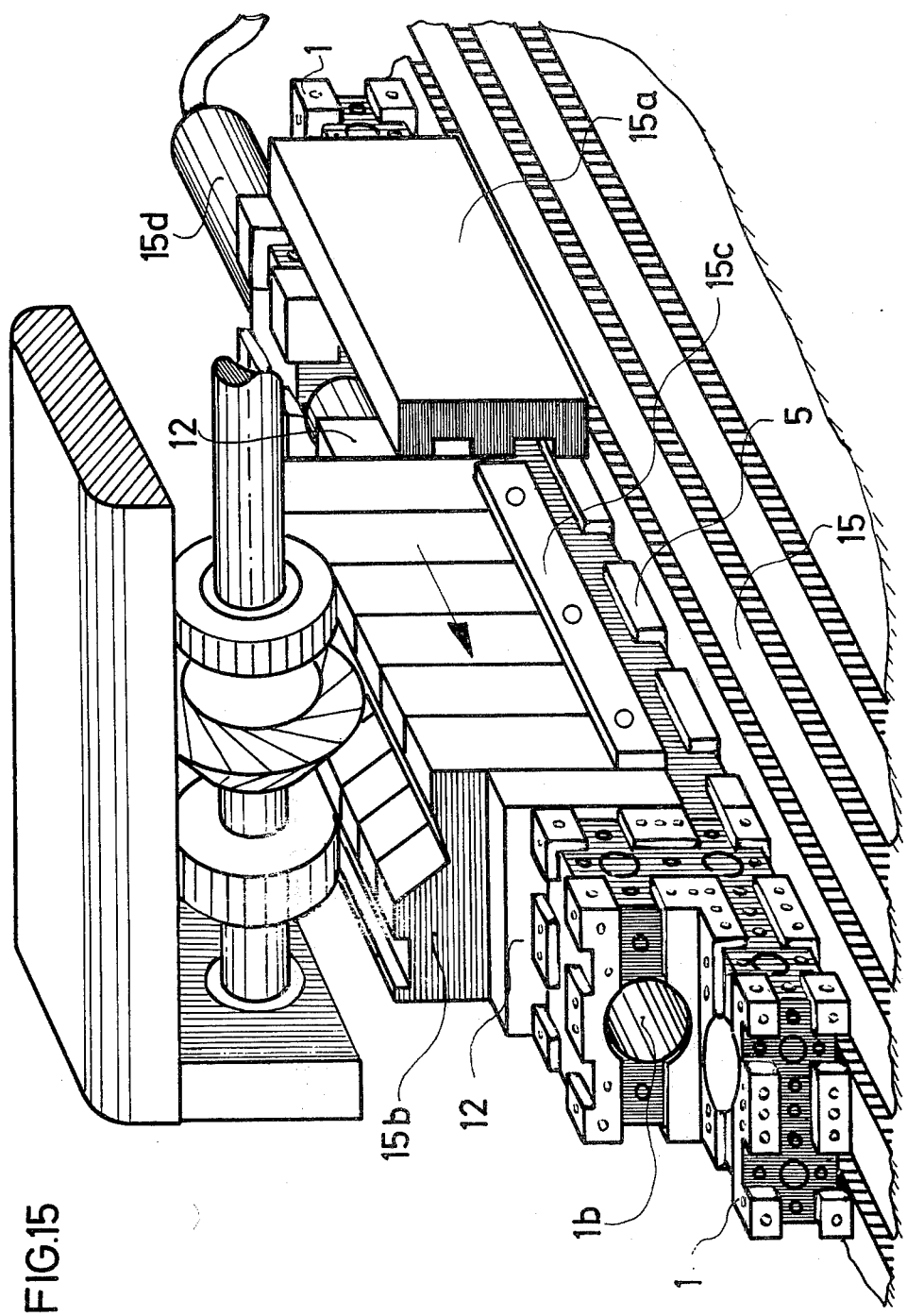
FIG. 15 is a perspective view of the fixture block shown in FIG. 1 as used as a stop for a hydraulic clamping device while milling a pack of component parts.

FIG. 15 shows a milling fixture in which two fixture blocks 1 form the main part. They are secured to the machine table 15 and are aligned in the working direction (arrow). A universal clamping plate 5 is placed between the fixture blocks and a guide gib 15a, and the workpiece 15b to be machined, for example, a pack of component parts, is supported thereon. Laterally, pack 15b is guided by means of a holding bar 15c. In the working direction, a contact jaw 12 is positioned between workpiece 15b and each of the fixture blocks 1. While the proximal (left) jaw 12 establishes a connection with the associated fixture block 1 by means of the smooth through bore 1b and a suitable member belonging to the system, at the distal end of workpiece 15b, a hydraulic clamping element 15d is received in through bore 1b of the respective other fixture block 1. If, in a well known manner, pressure fluid is supplied into this hydraulic element, the produced pressure acts, in the direction of the arrow, through one jaw 12, workpiece 15b and the other jaw 12, on the proximal (left) fixture block 1 which, in this case, has the function of a stop opposed to the clamping pressure.

Figure 16:
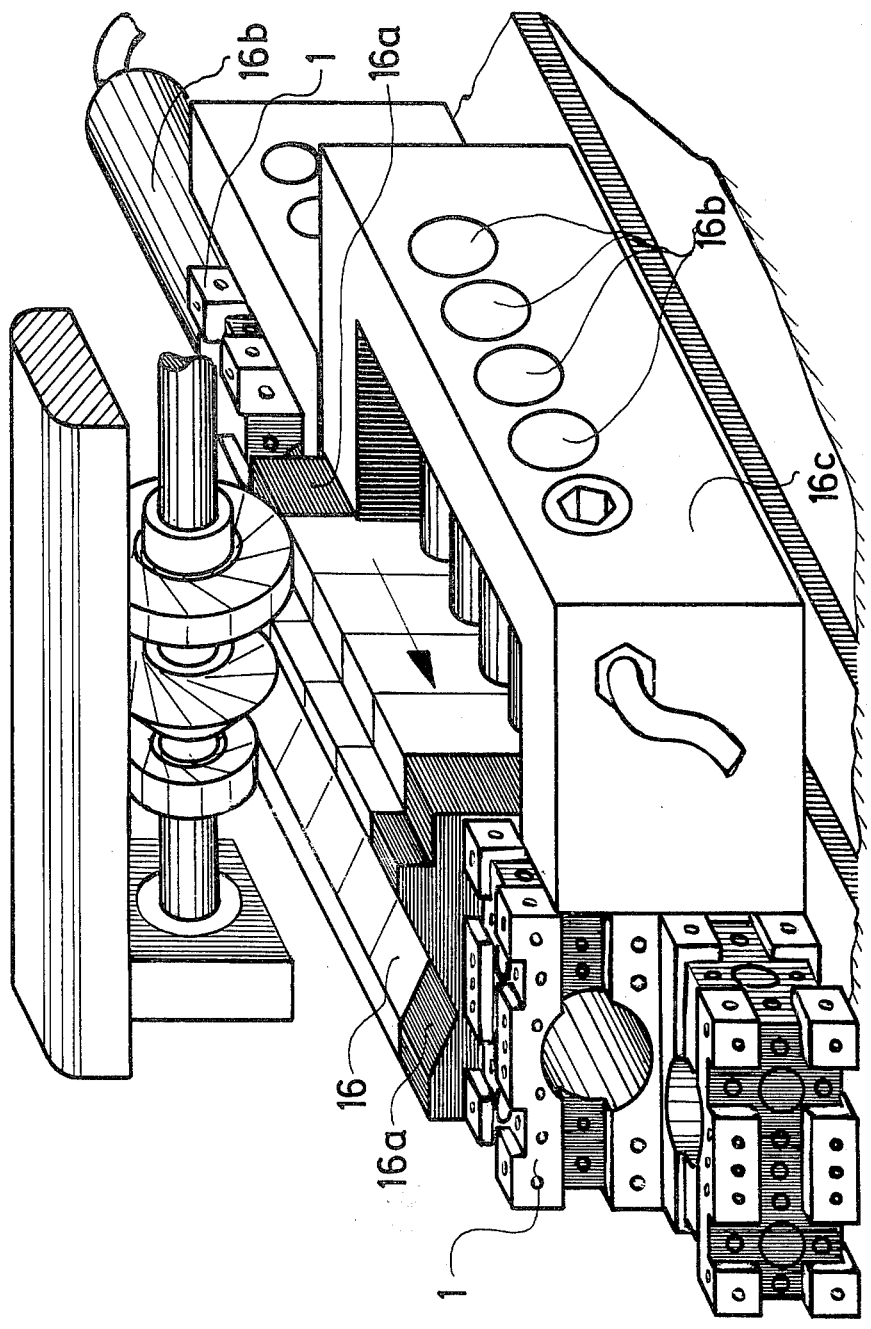
FIG. 16 is a perspective view of the fixture block shown in FIG. 1 used as a vise in connection with a hydraulic clamping device while milling a pack of component parts.

The vise shown in FIG. 16, and also intended for milling of a workpiece 16, is of a design similar to that of FIG. 15. Here again, two fixture blocks are used. Between these blocks 1, "soft" contact jaws 16a, conformable to the milling cutters and belonging to the system, are positioned. The clamping pressure acting in the working direction (arrow) is here again produced by means of a hydraulic clamping element 16b. The lateral pressure on the workpiece 16 is also produced by one or more hydraulic clamping elements 16b which are conjointly mounted in a hydraulic manifold 16c belonging to the building-block system.

Figure 17:
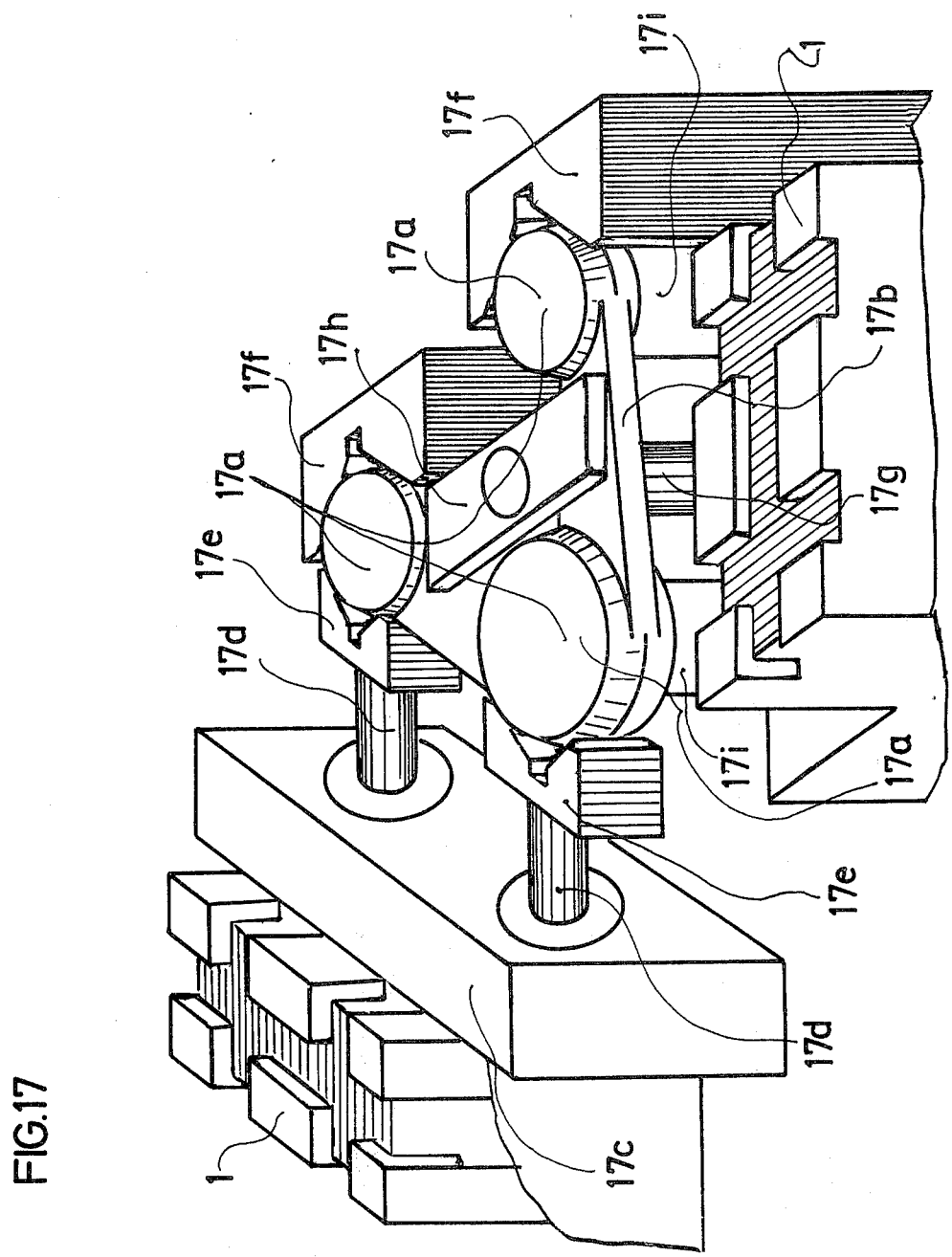
FIG. 17 is a perspective view of the fixture block shown in FIG. 1 used as a milling fixture for a toggle lever and in connection with a hydraulic clamping device comprising a manifold.

Another possible milling arrangement, using the inventive fixture block 1, is shown in FIG. 17. Here, for example, the bearing surfaces 17a of a toggle lever 17b, having unequal arms, are to be machined. For this purpose, the left-hand fixture block 1 is combined with a hydraulic manifold 17c. The hydraulic pistons 17d carry pressure members 17e serving to apply the bearing surfaces against prisms 17f belonging to the system. The front fixture block 1 also accommodates a hydraulic clamping element 17g which is received in smooth through bore 1b (FIG. 1) provided in the horizontal leg and which, in connection with a clamping gib 17h, determines the vertical position of the workpiece 17b. To compensate the level differences, conventional supporting jacks 17i may be used.

While utilizing the inventive fixture block 1 and further building blocks belonging to the system, drilling fixtures may also be assembled. Such fixtures are substantially adapted to the workpiece and three of them are shown in FIGS. 18, 19 and 20.

Figure 18:
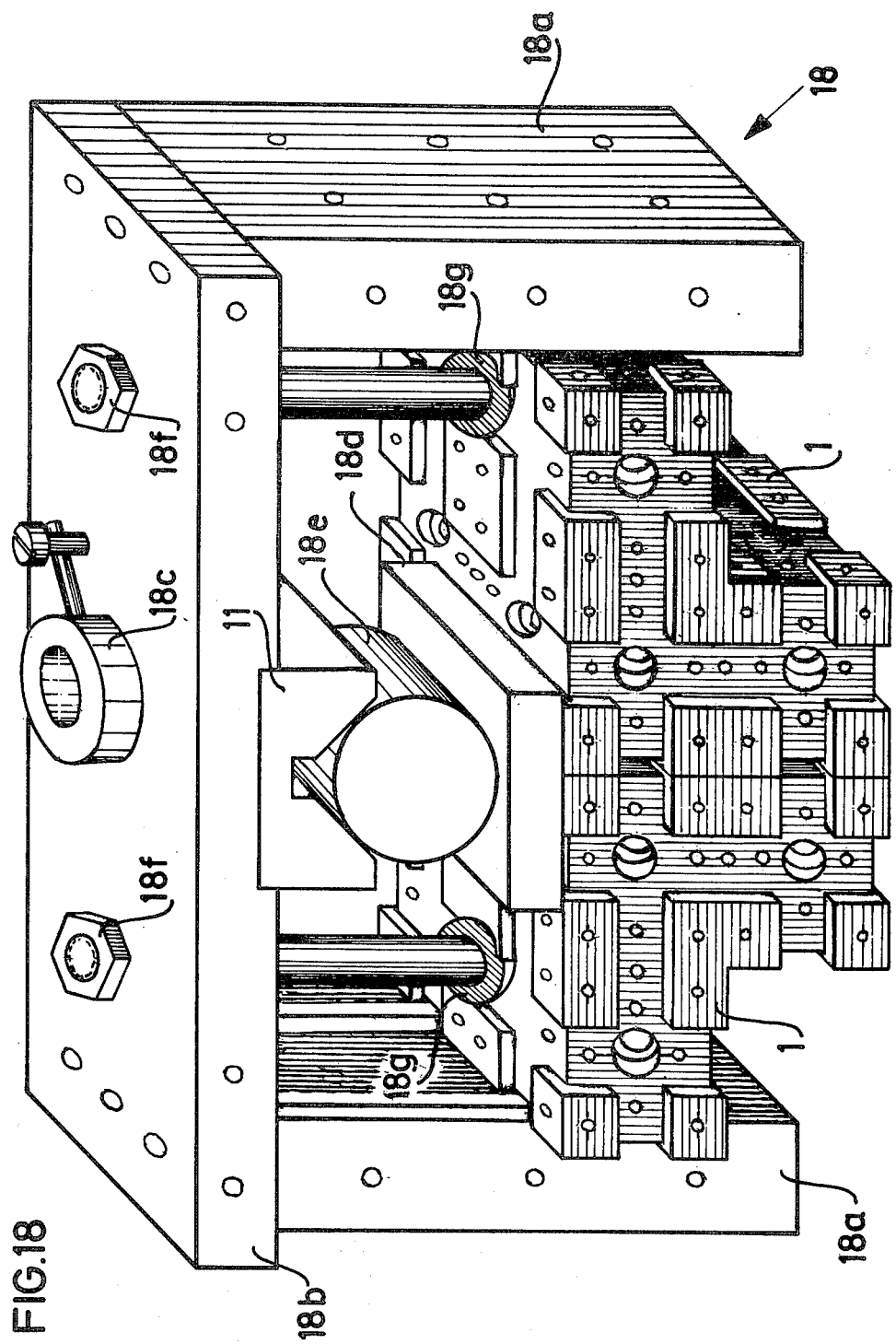
FIG. 18 is a perspective view of two fixture blocks as shown in FIG. 1 connected to each other and used as a support for a drilling device where the workpiece is fixed by means of a hydraulic clamping device.

In FIG. 18, two fixture blocks 1 from the base of a drilling fixture. Laterally, intermediate pieces 18a are screwed to fixture blocks 1 and support the drilling bridge 18b comprising a drill bushing 18c. The workpiece 18e rests on a contact jaw 18d which may also take the form of a prism. For centering the workpiece, a prism 11 (FIG. 11) is inset in drilling bridge 18b. Upon actuation of the hydraulic pistons, which are designed as tie rods 18f and form parts of hydraulic clamping elements 18g received in the smooth through bores 1b (FIG. 1), workpiece 18e is fixed on supporting jaw 18d by means of prism 11. After the drilling operation is terminated, the pressure in hydraulic system 18g is relieved, and workpiece 18e can be removed and replaced by another workpiece to be machined.

Figure 19:
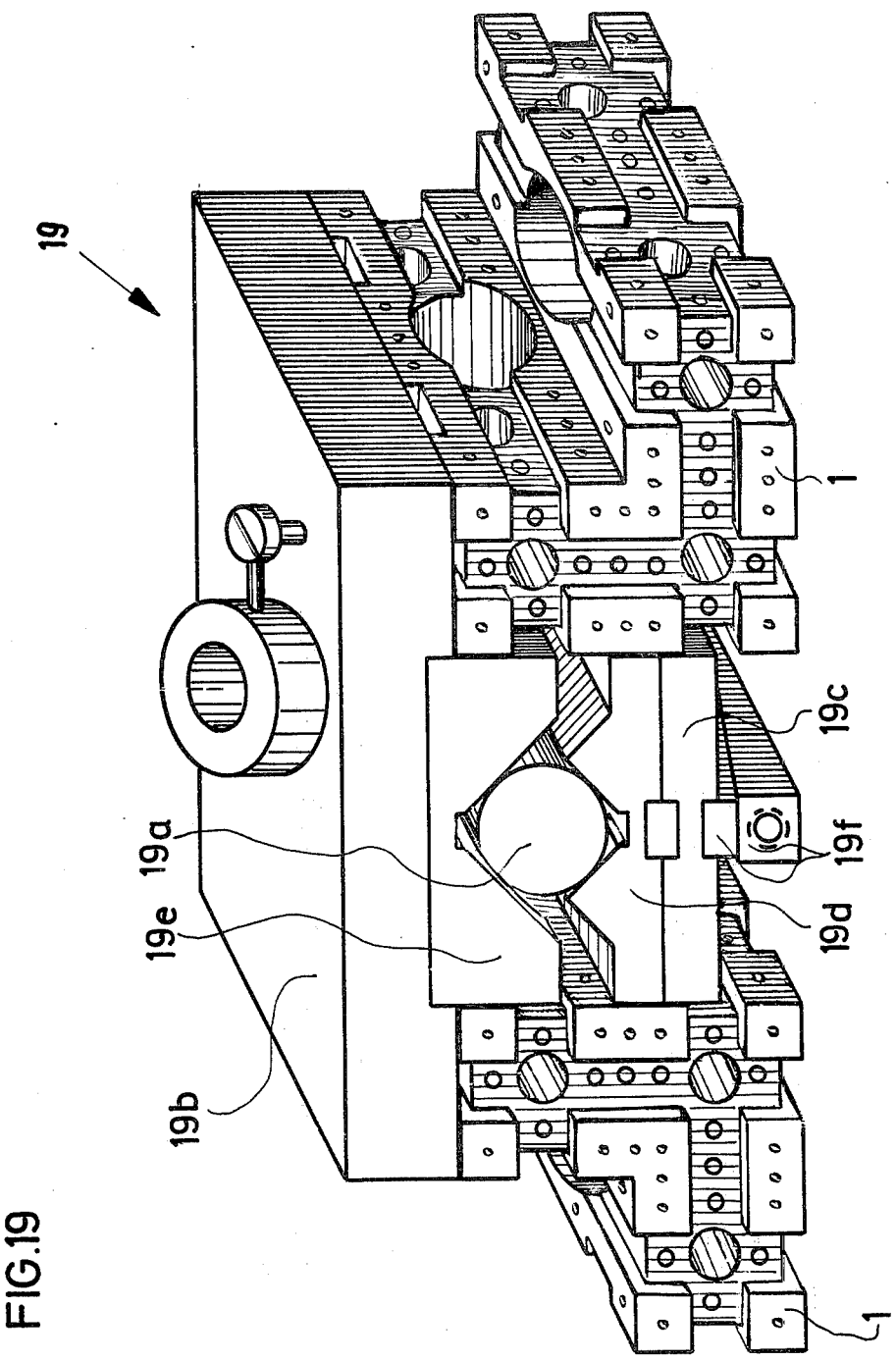
FIG. 19 is a perspective view of two fixture blocks as shown in FIG. 1, connected to each other and used as a drilling device different from that of FIG. 18.
Figure 20:
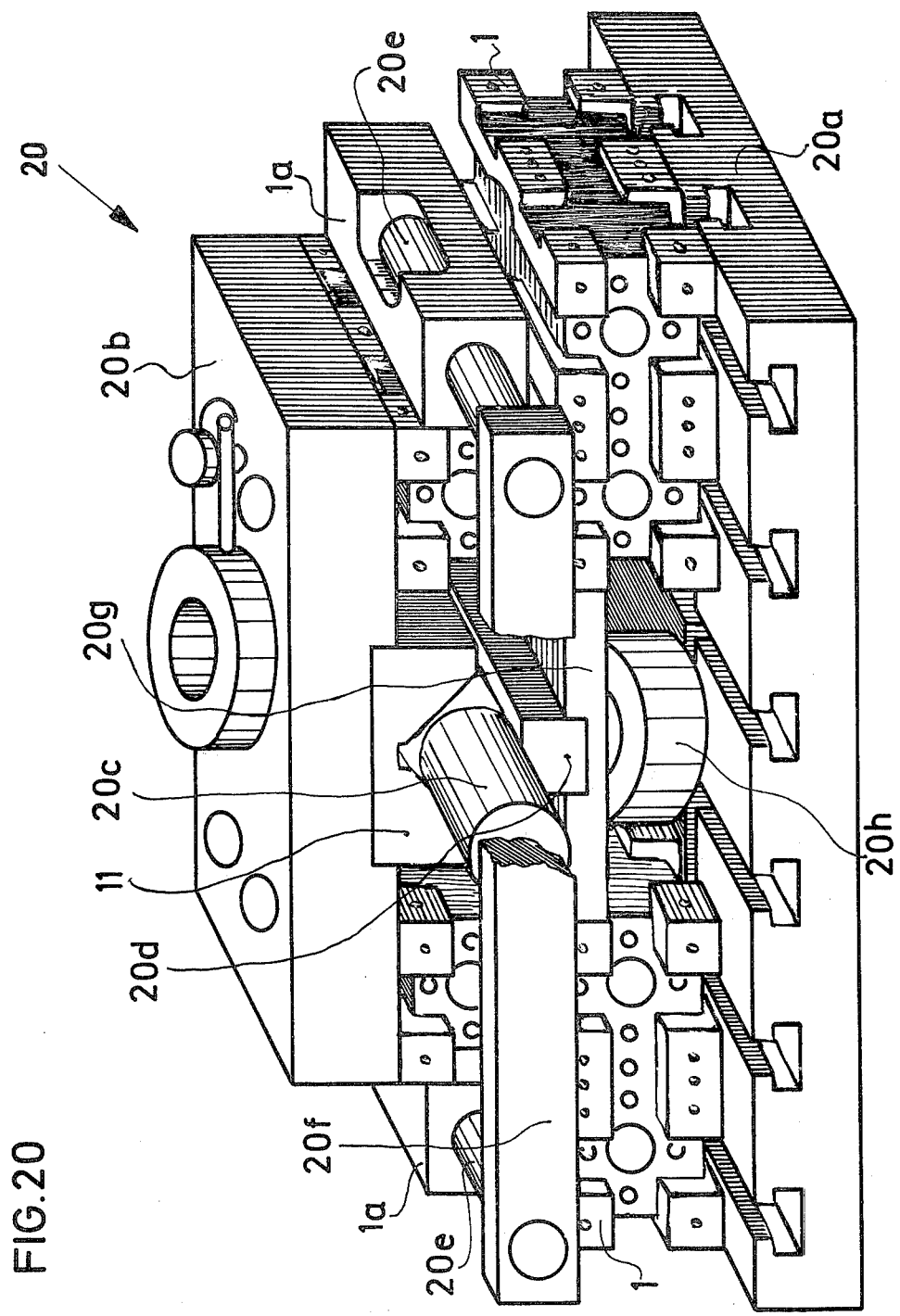
FIG. 20 is a perspective view of two fixture blocks according to FIG. 1, combined with another drilling device.

The drilling fixture shown in FIG. 19 is based on two fixture blocks 1 (FIG. 1) located laterally of workpiece 19a and connected to each other by a drilling bridge 19b. A displaceable and, if necessary, replaceable clamping prism 19d, serving as a support for the rotationally symmetrical workpiece 19a, is mounted on a movable clamping block 19c. A clamping prism 19e (FIG. 11), also replaceable, if necessary, and serving as an abutment for the workpiece 19a during the clamping is secured in drilling bridge 19b. The tight clamping of workpiece 19a in prisms 19d, 19e is effected by means of a chucking-wedge arrangement 19f known per se.

For building up a drilling fixture 20 (FIG. 20), a baseplate 20a of conventional design provided with T-grooves is used. Two inventive fixture blocks 1 (FIG. 1) are mounted thereon at a definite spacing from each other and are screwed, at their upper ends, to a drilling bridge 20b. A prism 11 (FIG. 11) is inset in bridge 20b and serves as an abutment for the workpiece 20c which is placed on a wedge-shape contact jaw 20d. As pressure is applied to hydraulic actuator 20h, guide plate 20g and contact jaw 20d are pressed against prism 11. Thereby, workpiece 20c is tightly clamped. Traverse 20f connects the two guide cylinders 20e which are adjustably mounted in bearing blocks 1a. Bearing blocks 1a, on their part, are mounted on fixture blocks 1 (FIG. 1). Due to this arrangement, it is made possible to position the bore to be machined at any desired distance from the front face of workpiece 20c.

Referring to FIG. 21, a fixture block 1, such as shown in FIG. 1, can also be used as a hydraulically or pneumatically actuated vise 21. For this purpose, a fixture block 1, having a jaw 21b secured to its vertical leg, is fixedly mounted on the remote end of a suitable baseplate 21a. Another fixture block 1, such as shown in FIG. 1, is secured on baseplate 21a adjacent the other end thereof, and has a hydraulic clamping actuator 21c mounted in the smooth bore 1b of its vertical leg. The piston of actuator 21c, which does not appear in FIG. 21, acts on a pressure plate 20d to which there is secured a jaw 21b. Pressure plate 20d is guided laterally in correspondingly designed profile gibs 21e.

The universal applicability, in the true sense of the word, of fixture block 1, as shown in FIG. 1, is evident, in the clearest sense, from FIG. 22. In this case, a surface 22a of a workpiece 22 is to be machined, for example, milled, ground, or the like. For this purpose, a corresponding inclined position of a fixture block 1, mounted on a baseplate 22b, is needed. Prior to positioning of fixture block 1 on baseplate 22b, two stop bars 22c, as well as a further stop bar 22d and workpiece stops 22e, are screwed to the fixture block 1 or placed thereon, respectively. Thereupon, while using gauged end measuring blocks 22g held by a jack 22f, gauge rolls 22h, each having a diameter of 20 mm, are inserted and rest, respectively, against the end measuring blocks 22g and the adjacent stop bar 22c and against the other stop bar 22c as well as against a stop 22i which is fixed to the baseplate. A holder 22k, secured to baseplate 22b, engages into one of the smooth through bores 1a provided in fixture block 1, while hydraulic clamping element 22m retains the workpiece 22 in the true angular position on stops 22c, 22d secured to fixture block 1.

The true angular fixing of workpiece 22 on the fixture block depends on a similar true angular fixing of the fixture on the baseplate 22b. Except for the above mentioned mechanical preparations, the fixing block 1 in its true angular position can be done in a relatively simple manner and without any computation. With the given modular system, the length of fixture block 1 is 2 times 60 mm and the center-to-center distance of the two gauge rolls 22h is 100 mm. At the same time, this center-to-center distance is the hypotenuse for the sine relation. Assuming that the angle read in the working drawing is 30°, the corresponding sine is 0.5 (for other angles, according to sine tables). Consequently, the super elevation is 50 mm which must correspond to the structural height of the superposed end measuring blocks 22g.

According to FIG. 23, two fixture blocks 1 are secured on a completely plane and precison-machined measuring plate (not shown), at a definite spacing from each other. The blocks are positioned with their vertical legs facing each other. On each of these vertical legs, a respective prism 11 (FIG. 11) is secured and serves to receive a center point 23a. To complete the seating of center points 23a, a respective conformable standard component part 23b is connected to each of the prisms. Tommy screws 23c, extending through component parts 23b, clamp the center points or, upon their release, permit an axial displacement of center points 23a.

Between center points 23a, a rotationally symmetrical workpiece 23d is rotatably mounted. Laterally of the two fixture blocks 1 and connected thereto, a universal building block 3 (FIG. 3) having the form of a parallelepiped is located on the measuring plate. Block 3 serves as a support for holders 23e of dial gauges 23f, by means of which the rotational accuracy, the eccentricity, or also the parallelism of the cylindrical surfaces of workpiece 23d can be measured.

Figure 24A:
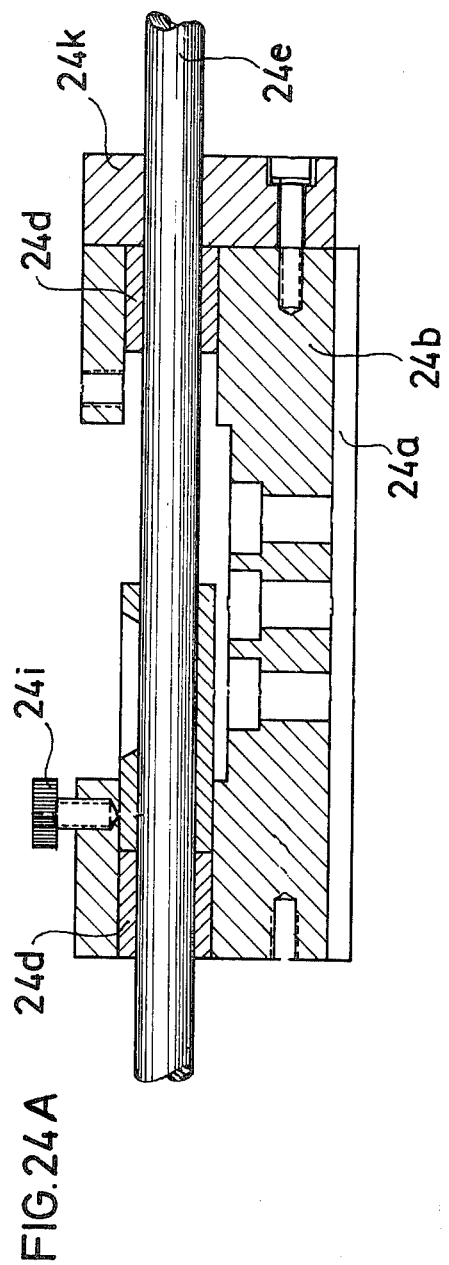
FIGS. 24A and 24B are, respectively, a vertical sectional view and a top view of a precision measuring device to be used as an additional or combination element for the fixture block shown in FIG. 1.
Figure 24B:
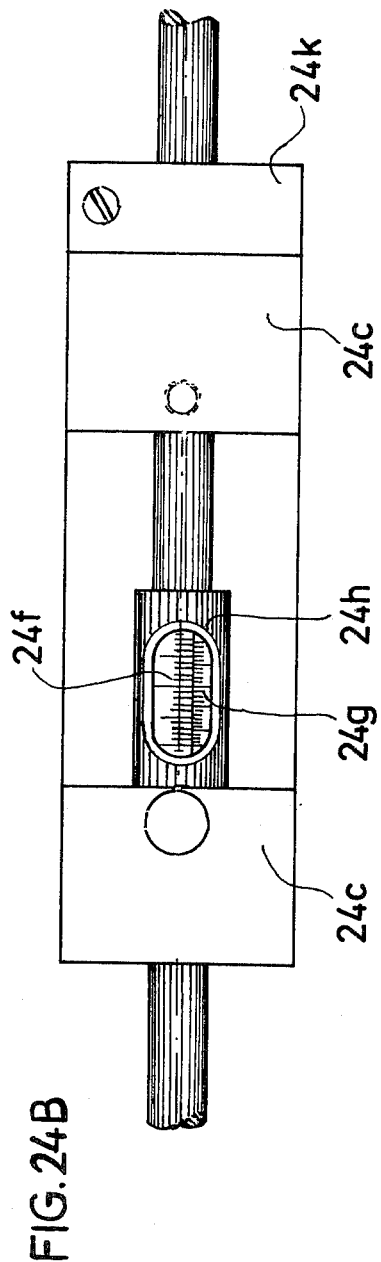
Figure 25:
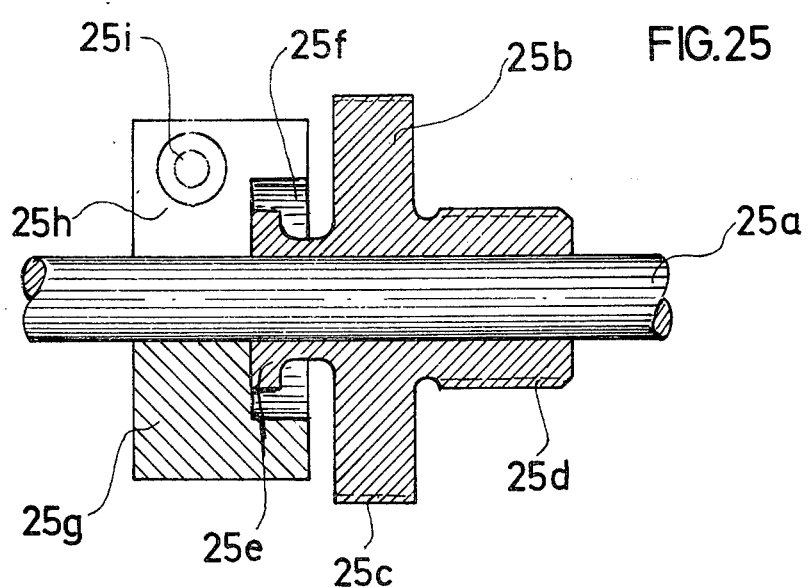
FIG. 25 is a vertical sectional view of a precision adjustment device to be used as an additional or combination element for the fixture block shown in FIG. 1.

The precision measuring device shown in FIGS. 24A and 24B, as well as the accurate stop adjustment shown in FIG. 25, serve as supplementary or combining elements for the further development and completion of the building-block system which is substantially based on fixture block 1.

In FIGS. 24a and 24B, a guide rail 24b, formed with at least one longitudinal groove 24a, is provided with eyes 24c serving, in connection with guide bushings 24d press-fitted therein, to receive an axially shiftable shaft 24e. Shaft 24e is provided with a measuring scale 24f, and a vernier tube 24h, also provided with a graduation 24g, is slipped over shaft 24e and adapted to be arrested by means of a setscrew 24i. For fixing shaft 24e in the axial direction, a clamping piece 24k is provided which, for example, is unilaterally slit. The measuring operation known per se, for example, for measuring the depth of internal bores of a workpiece (not shown) or the like, corresponds, in principle, to that used with sliding calipers or depth gauges. The same applies to the measuring accuracy.

For certain measuring operations, a device for the fine adjustment of a stop, shown in FIG. 25, is provided. In FIG. 25, a shaft 25a is provided with a threaded adjustment ring 25b. For a better grip, the ring is provided with a knurling 25c and, for the adjustment, is formed with a thread 25d. Flange 25e of ring 25b is guided in a rotationally symmetrical recess 25f formed in clamping piece 25g. Clamping piece 25g is formed with a slot 25h and can be clamped to shaft 25a by means of a clamping screw 25i. Recess 25f is penetrated by a bolt 25k extending tangentially thereacross and effecting the connection between ring 25b and clamping piece 25g.

Figure 26:
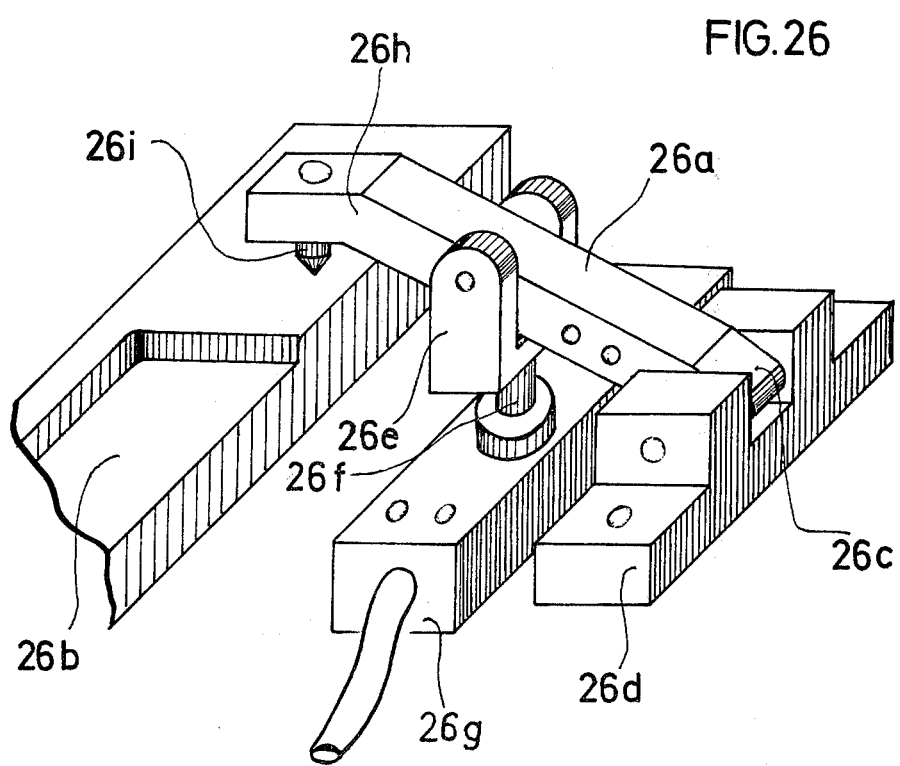
FIG. 26 is a perspective view of a universal clamping shoe to be used as an additional or combination element for the fixture block shown in FIG. 1.

FIG. 26 shows a universal clamping shoe 26a for the clamping of a workpiece 26b. This clamping shoe again serves as a supplementary or combining element for the development and completion of the building-block system based substantially on fixture block 1 (FIG. 1).

At its lower end 26c, clamping shoe 26a is rotatably fixed in bearing block 26d. At a definite or determinable distance from its lower axis of rotation, clamping shoe 26a is connected to a fork 26e which, in its turn, is connected to the free end of a hydraulically actuated piston 26f. Upon applying pressure to hydraulic piston 26f, which is mounted in the hydraulic manifold 26g belonging to the system, the pressure point 26i of clamping shoe 26a is pressed against workpiece 26b. As usual in a hydraulic system, the pressure of the clamping shoe can be controlled and adapted to the requirements of each case.

Figure 27:
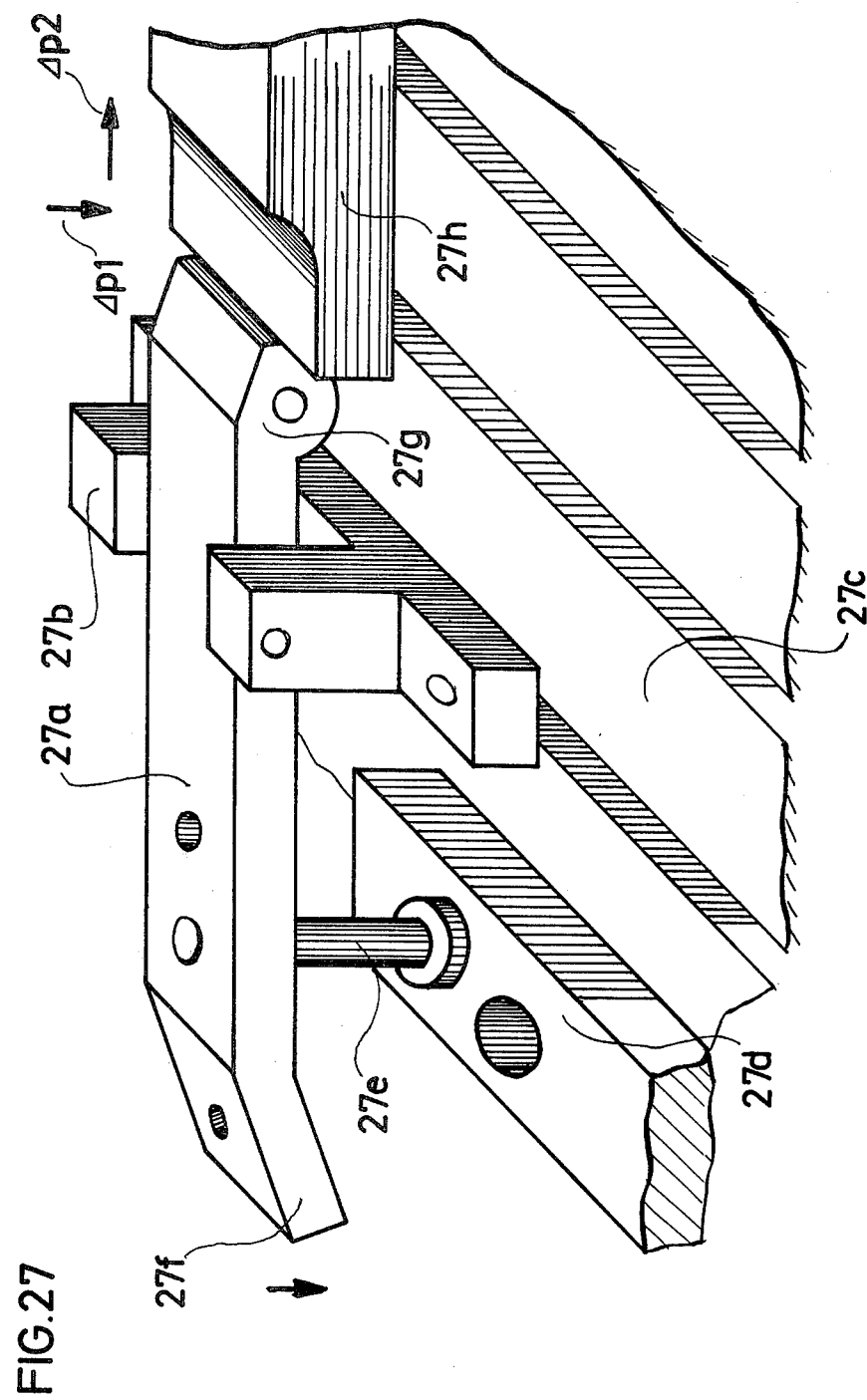
FIG. 27 is a perspective view of the universal clamping shoe of FIG. 26 in another application.

The mentioned universal clamping shoe is also shown in FIG. 27, in another application. In FIG. 27, clamping shoe 27a is rotatably mounted in bearing block 27b which, in turn, is secured to the machine table 27c. A hydraulic piston 27e mounted in hydraulic manifold 27d acts, in the direction of the arrow, on the left end 27f of shoe 27a while the right end 27g, under the lever action, tightly clamps the workpiece 27h to the machine table 27c. The clamping motion is appropriately influenced by a corresponding design of the end portion 27g of clamping shoe 27a. In the illustrated example, one component $\Delta p_1$ of the clamping pressure acts in the vertical, and another component $\Delta p_2$ in the horizontal direction, as per the directions of forces indicated by arrows.

Figure 28:
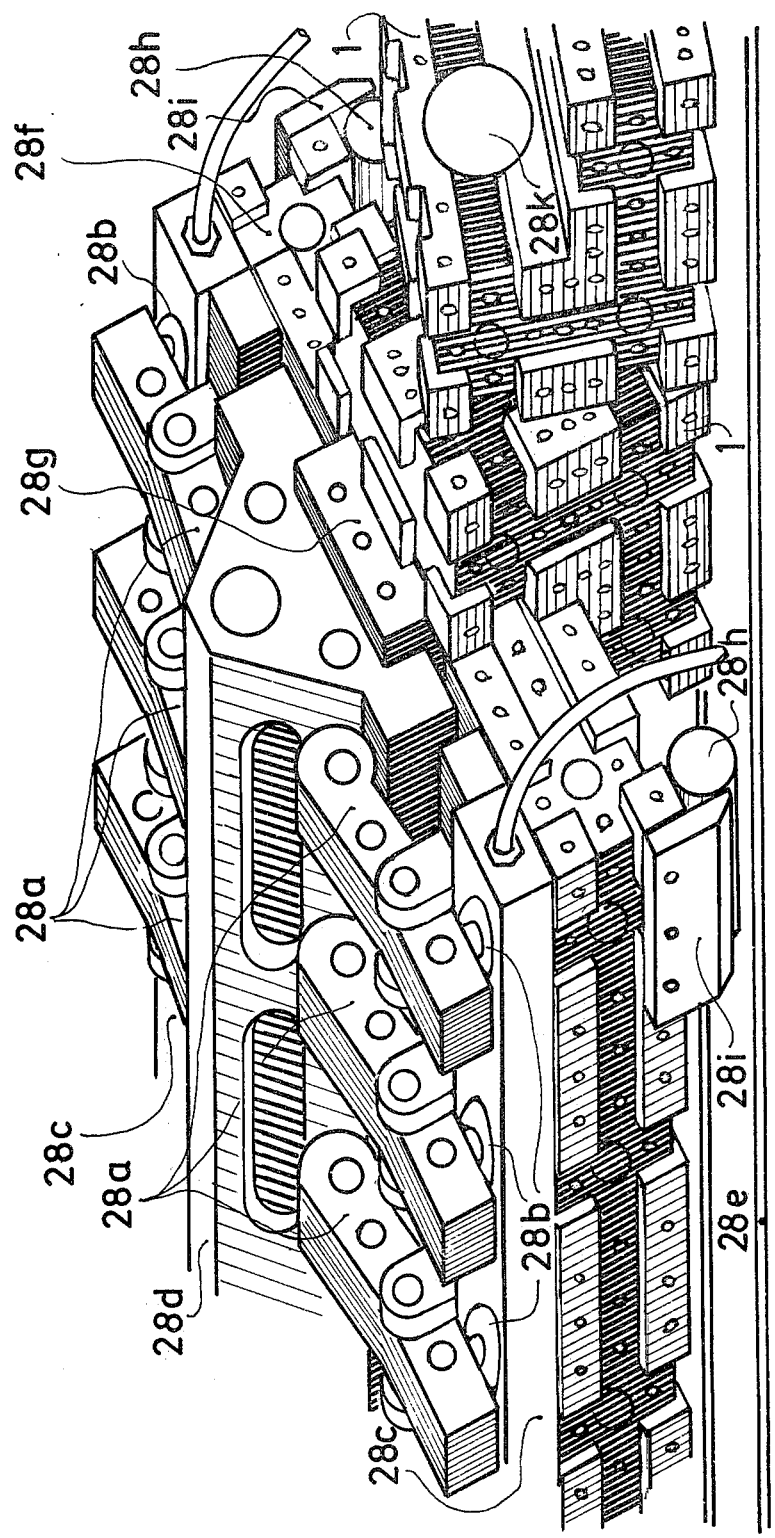
FIG. 28 is a perspective view of of a clamping device utilizing the sine principle and comprising the four fixture blocks of FIG. 1 and six universal clamping shoes.

The universal application of the building-block system using the inventive fixture block 1 (FIG. 1) is further illustrated in FIG. 28. In this Figure, six universal clamping shoes 28a, actuated by a corresponding number of the system's own hydraulic cylinders 28b of which three each are mounted in respective common hydraulic manifolds 28c, clamp a workpiece 28d in a definite inclined position to the machine table 28e while using the sine arrangement (FIG. 22).

A universal building block 28f, such as shown in FIG. 3, and, in addition, a stop bar 28g, both belonging to the system, are provided for axial fixing of workpiece 28d. Block 28f is secured to a first fixture block 1 which is brought into an inclined position at a certain angle in accordance with the sine arrangement and which is connected, by means of a bolt, pin, or the like 28k, to a second fixture block 1 (FIG. 1) mounted on the machine table 28e. At its opposite end, not represented in FIG. 28, workpiece 28d is mounted or secured in the same manner. The gauge rolls are designated 28h and the stop bars 28i.

Figure 29:
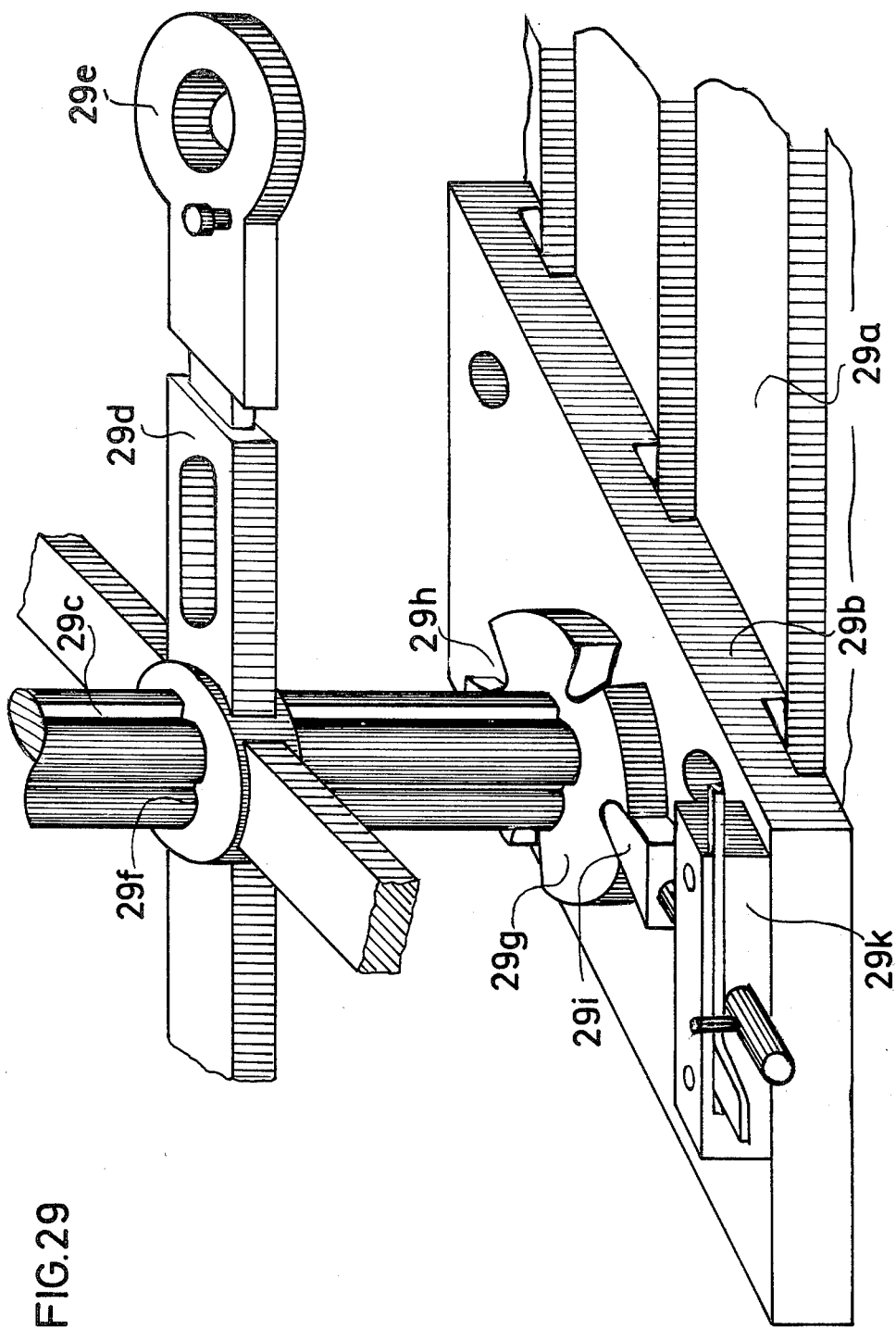
FIG. 29 is a perspective view of an adjustable drilling-bridge bridge holder for four drilling bridges, designed as a four-arm support, to be used an an additional or combination element for the fixture block shown in FIG. 1.

Finally, another variant of application of the buildingblock system while using blocks inherent in the system is shown nin FIG. 29. In FIG. 29, a baseplate 29b is secured to a machine table 29a. In the center of the baseplate, a column 29c, provided with parallel guide strips, is rotatably mounted. On this column, a four-armed support 29d is mounted, each arm supporting a drill bush carried 29e. Support 29d is provided with recesses 29f conformable to the corresponding axially parallel guide strips of column 29c so that a rigid and, at the same time, play-free coupling is produced therebetween.

In the same manner, an index plate 29g is mounted on column 29c below the four-armed support 29d, resting against baseplate 29b. Through its recesses 29h, index plate 29g is operationally connected to an index bolt 29i which is guided for axial displacement in a bearing block 29k.

Figure 30:
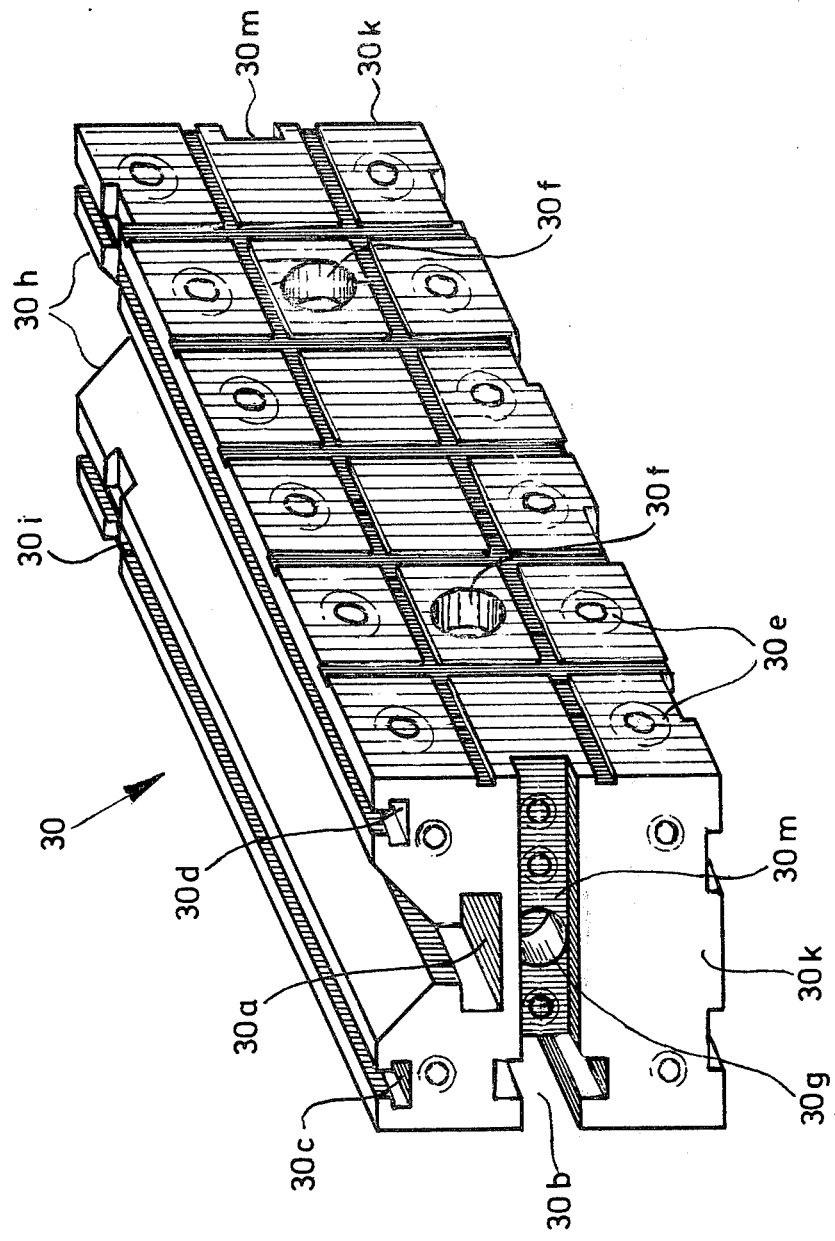
FIG. 30 is a perspective view of a universal prism having a plurality of T-grooves longitudinally extending parallel.

The universal prism 30 shown in FIG. 30 can also be combined, in application of the building-block principle underlying the invention, both with fixture block 1 (FIG. 1) and with other building blocks belonging to the system, in an excellent manner. For this purpose, universal prism 30 is formed with a plurality of mutually parallel T-grooves 30a, 30b, 30c, 30d extending in the axial direction and spaced from each other in accordance with the provided module, tapped holes 30e, and through bores 30f, 30g, in the same manner as fixture block 1. Further, in the zone of its prismatic surfaces 30h, universal prism 30 is provided with a base groove 30i extending at a right angle to prismatic surfaces 30h. To be able to use means of retention and fixation for further, differently designed building blocks, recesses 30m are provided in the end surfaces 30k extending transversely to the longitudinal extent of universal prism 30. The mutually parallel surfaces of T-grooves 30a, 30b, 30c, 30d are hardened and ground. Thereby, an extraordinarily accurate mutual contact or guidance of building blocks and also of measuring devices is ensured.

Figure 31:
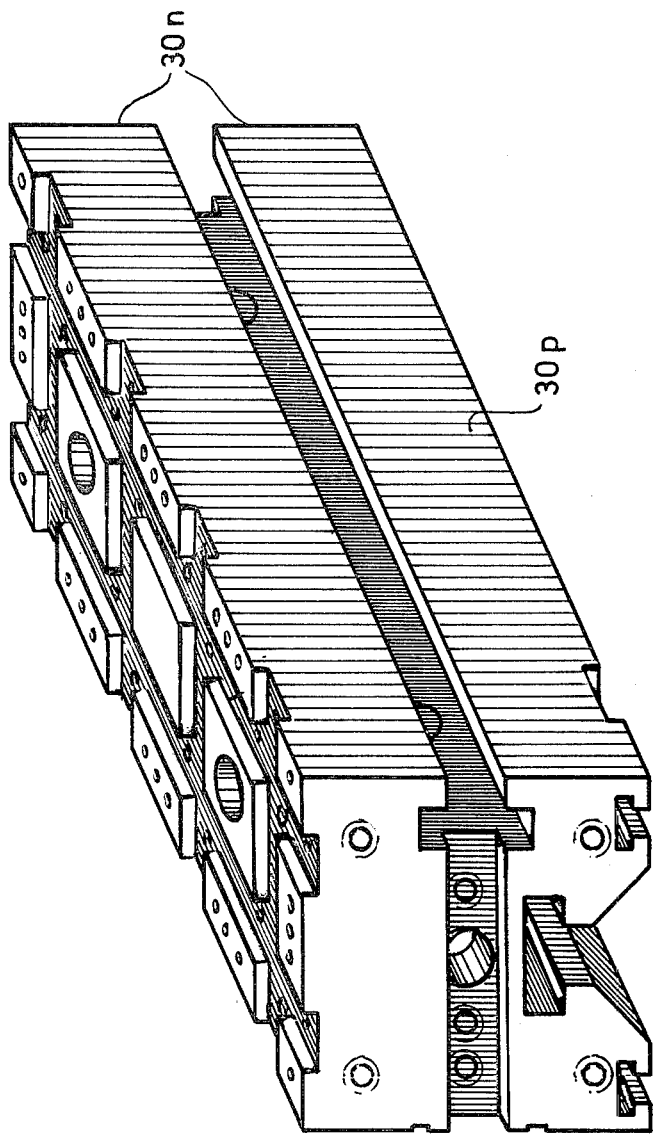
FIG. 31 shows the back side of the universal prism of FIG. 30, which is serrated transverseley to its longitudinal extent.

The back side 30n of universal prism 30 (FIG. 31) is provided with a serration 30p. Such a serration insures or favors, for example, the assembly of a sine table in the sense of the solution shown in FIG. 22.

While specific embodiments of the invention have been shown and described in detail to illustrate the application of the principles of the invention, it will be understood that the invention may be embodied otherwise without departing from such principles.

REFERENCES 1.0 Hans E. Scheibe: "Hilfsbuch für den VorrichtungsKonstukteur und Werkzeugmacher" (Manual for the fixture designer and toolmaker), published Richard Carl Schmidt & Co., Berlin, 1945

2.0 Prospectus of the trust "VEB Werkzeugmaschinenkombinat Fritz Heckert", Fixture-Construction Works, Hohenstein, DDR-927, Hohenstein-Ernstthal/-Sachsen, Issue 1970-AG 09/181/70 "Fixture Building blocks in the Groove System".

What is claimed is:

1. In a building block system including a fixture block serving as a manufacturing accessory, particularly for the machining of metal workpieces and the like, adapted to be combined with further correspondingly designed accessories with the aid of which workpieces to be machined can be brought into proper position or orientation for the particular machining operation, such as planing, milling, drilling, honing, grinding, and the like, and maintained in such proper position or orientation during at least one working cycle, the improvement comprising a basic fixture block formed as an L-shape body, having its shape derived from the geometrical form of a rectangular parallelepiped with all intersecting surfaces being mutually perpendicular to each other, having a pair of mutually perpendicular legs each having relatively wider inner and outer surfaces joined to each other by relatively narrow side surfaces, with the length and width of the relatively wider outer surface of each leg being equal to each other and to the length and width, respectively, of the relatively wider outer surface of the other leg, and the thickness, across the relatively narrow surfaces, of each leg being equal to one-half such length or width; the inner, outer and side surfaces of said legs forming contact surfaces and being formed with aligned rows of coplanar projecting areas separated by machined rows of coplanar recessed areas; all the surfaces of said block being formed with a plurality of tapped bores and with smooth untapped bores of different diameters, which at least partially intersect each other within the block.

2. In a fixture block serving as a manufacturing accessory, the improvement claimed in claim 1, in which said tapped bores are provided in both the recessed areas and the projecting areas of all surfaces of the block, the projecting areas of the block surfaces being those which have not been machined during machining of the recessed areas.

3. In a fixture block serving as a manufacturing accessory, the improvement claimed in claim 1, in which said intersecting bores are through bores.

4. In a fixture block serving as a manufacturing accessory, the improvement claimed in claim 3, in which certain of said through bores extend between recessed areas of the surfaces of said body.

5. In a fixture block serving as a manufacturing accessory, the improvement claimed in claim 3, in which said through bores include at least one large diameter through bore extending through each leg, perpendicularly to the inner and outer surfaces thereof, and opening through one of the respective projecting areas.

6. In a fixture block serving as a manufacturing accessory, the improvement claimed in claim 1, in which said tapped bores serve receiving threaded elements for securing manufacturing accessories, designed in correspondence with the design of said block, to said fixture block.

7. In a fixture block serving as a manufacturing accessory, the improvement claimed in claim 3, in which said through bores serve for mounting therein conformingly designed auxiliary means for effecting the mechanical, hydraulic, pneumatic and electromagnetic clamping of workpieces to be machined.

* * * * *